US008832545B2

(12) United States Patent  (10) Patent No.: US 8,832,545 B2
Hays et al.  (45) Date of Patent: Sep. 9, 2014

(54) METHOD AND SYSTEM FOR GENERATING INSPECTION DATA AND USING THE INSPECTION DATA FOR RECORDING OBSERVATIONS OF AN INSPECTION SITE

(75) Inventors: James Allan Hays, Alpine, CA (US); Darrell Spencer Martin, El Cajon, CA (US)

(73) Assignee: James Allan Hays, Alpine, CA (US)

(*) Notice: Subject to any disclaimer, the term of this patent is extended or adjusted under 35 U.S.C. 154(b) by 332 days.

(21) Appl. No.: 12/965,692

(22) Filed: Dec. 10, 2010

(65) Prior Publication Data

US 2012/0151318 A1   Jun. 14, 2012

(51) Int. Cl.
*G06F 17/00* (2006.01)

(52) U.S. Cl.
USPC ........... 715/221; 715/749; 715/224; 715/226; 715/703; 715/764; 703/1; 707/999.1

(58) Field of Classification Search
USPC ................. 715/221, 852, 224, 226, 703, 479; 709/999.1; 703/1; 707/999.1
See application file for complete search history.

(56) References Cited

U.S. PATENT DOCUMENTS

| 7,107,278 | B1 * | 9/2006 | Bandemer ..................... 707/102 |
| 2003/0040934 | A1 * | 2/2003 | Skidmore et al. ................. 705/1 |
| 2005/0267900 | A1 * | 12/2005 | Ahmed et al. ................ 707/100 |
| 2009/0174768 | A1 * | 7/2009 | Blackburn et al. ............ 348/130 |
| 2012/0235944 | A1 * | 9/2012 | McIntosh ...................... 345/173 |

* cited by examiner

*Primary Examiner* — Quoc A Tran
(74) *Attorney, Agent, or Firm* — Knobbe Martens Olson & Bear, LLP

(57) ABSTRACT

A method and system for generating and using inspection data is disclosed. Prior to an inspection, inspection data is generated which includes location and component attributes, observation codes, and relationships between the location and component attributes and observation codes. During an inspection, an inspector accesses the inspection data to generate a data entry form which reflects the attributes, observation codes, and the relationships chosen during the inspection data generation. The inspector uses the data entry form to generate an inspection record having a structure based on the predefined inspection data.

12 Claims, 22 Drawing Sheets

FIG. 10

METHOD AND SYSTEM FOR GENERATING INSPECTION DATA AND USING THE INSPECTION DATA FOR RECORDING OBSERVATIONS OF AN INSPECTION SITE

BACKGROUND

1. Field

The described technology relates generally to systems and methods of generating inspection data and using the inspection data at an inspection site to record observations.

2. Description of the Related Technology

For various and numerous reasons, inspections are performed by an inspector making observations at an inspection site. The inspector memorializes the observations by making a record so that the inspector or others may later refer to the observations to understand the state of the observation site at the time of inspection. For example, for investigations related to construction defect litigation, an inspector visits a site of an alleged construction defect. The inspector makes observations, such as at an improperly sealed window, and records the observations of water damage at and below the window.

The amount and detail of observational information collected by an inspector at different inspection sites may vary greatly. At some sites, for example, the amount of collected information may be related to many different categories, and may have many details for each category. At other sites, the collected information may be much less complicated. Because of the numerous possibilities of observations and details, and additionally because the observations are made and recorded by different inspectors, the reports for multiple inspections tends to be inconsistent and difficult to compare to one another.

SUMMARY OF CERTAIN INVENTIVE ASPECTS

Methods and systems for generating and using inspection data are discussed and described below. Prior to an inspection, inspection data is generated which includes location and component attributes, observation codes, and relationships between the location and component attributes and observation codes. During an inspection, an inspector accesses the inspection data to generate a data entry form which reflects the attributes, observation codes, and the relationships chosen during the inspection data generation. The inspector uses the data entry form to generate an inspection record having a structure based on the predefined inspection data.

BRIEF DESCRIPTION OF THE DRAWINGS

FIG. 10 is a screen shot of an embodiment of a selection screen.

DETAILED DESCRIPTION OF CERTAIN INVENTIVE EMBODIMENTS

Various aspects and features are described more fully hereinafter with reference to the accompanying drawings, in which exemplary embodiments are shown. As those skilled in the art would realize, the described embodiments may be modified in various ways, without departing from the spirit or scope of the present invention.

The terminology used in the description presented herein is not intended to be interpreted in any limited or restrictive manner, simply because it is being utilized in conjunction with a detailed description of certain specific embodiments. Furthermore, embodiments can include several features, no single one of which is solely responsible for its desirable attributes or which is essential to practicing the inventions herein described, and the features of the various embodiments may be combined in other embodiments not specifically described.

Various inventive aspects of certain embodiments of methods and systems for generating inspection data and using the inspection data for recording observation data from an inspection site are discussed. The methods and systems can be used to generate inspection data prior to an inspector visiting an inspection site. Based on observations at the inspection site, the investigator uses the generated inspection data to record details of the observations. Among other advantageous results, because the inspection data has certain aspects which are consistant across many or all inspections using the system, such as terminology and data entry structure, the records of the various inspection observations are complete and are consistent across the multiple inspection records. The various aspects and embodiments are particularly advantageous for inspections of construction sites, commercial buildings, occupied dwellings, government agency inspections, (HUD, USDA, ATF, FDA, etc.), civil site inspections, pre-purchased home inpsections, public safety inspections (e.g. police, fire), medical data collection, military inspections, health and safety inspections, food safety inspections.

Figure 1:
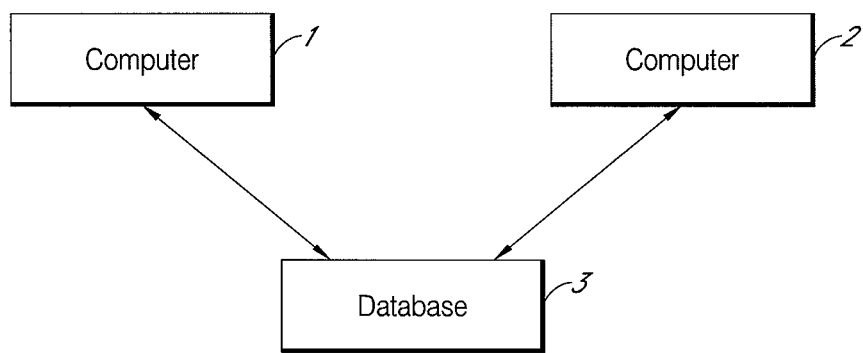
FIG. 1 is a block diagram of a system 5 for generating and using inspection data.

FIG. 1 is a block diagram of a system 5 for generating and using inspection data. In this embodiment, the system 5 includes computer 1, computer 2, and database 3. Computer 1 is used by an administrator to generate inspection data, which is stored in database 3. Computer 2 is used by an inspector to record observations of an inspection site in an entry form generated according to the inspection data from the database 3 to create an inspection record. Because the data entered into the inspection record is guided by the data entry form generated according to the inspection data, the data entered into the inspection record conforms to the format and content of the inspection data generated by the administrator.

As a result the inspection records of the various inspections are consistant in content and format.

The communication links between the computers 1 and 2 and the database 3 may be wired or wireless. In some embodiments, computers 1 and 2 also have a wired or wireless communication link. The communication links may be part of a network, such as the internet. In some embodiments, the database 3 is stored in a memory of either of computers 1 and 2. In some embodiments, computers 1 and 2 are not separate, but are the same computer. In some embodiments, the administrator and the inspector are the same individual.

Figure 2:
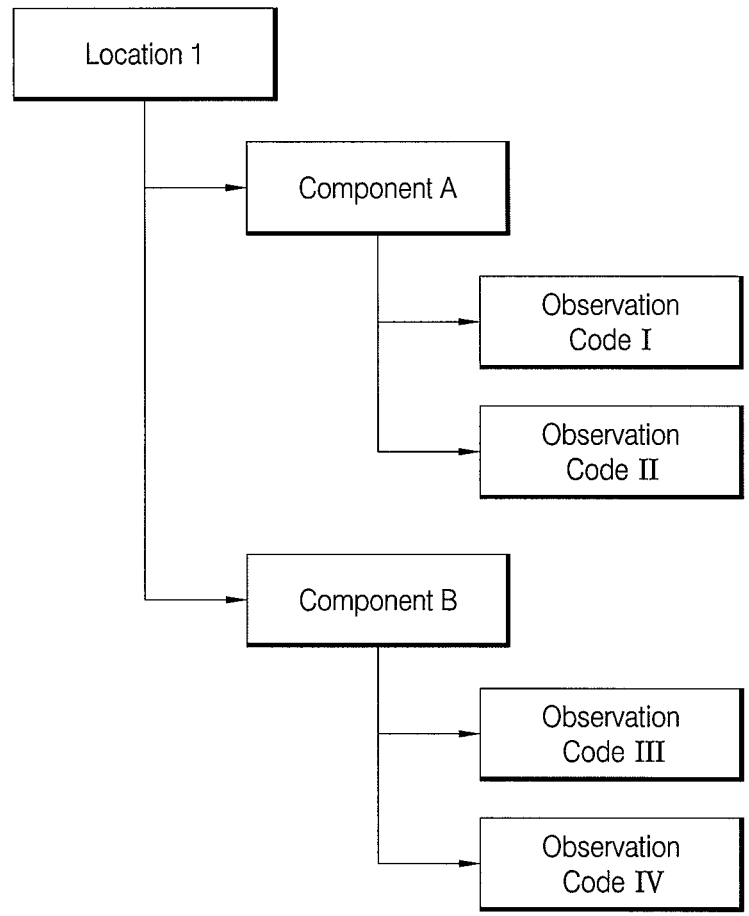
FIG. 2 is a database schematic showing an embodiment of inspection data generated by an administrator and accessed by an inspector.

FIG. 2 is a database schematic showing an embodiment of inspection data generated by an administrator with computer 1 and accessed by an inspector with computer 2. The top level is a location attribute called "location 1". For construction site inspections, location 1 may, for example, be a bedroom or a bathroom. Associated with location 1 are component attributes called "component A" and "component B." For construction site inspections, component attributes may be a window, a door, or a sink. Associated with component A are observation code attributes called "observation code I" and "observation code II." Associated with component B are observation code attributes called "observation code III" and "observation code IV." For construction site inspections, observation code attributes may include, for example, a leak or a gap.

In other embodiments, multiple location attributes are typically part of the inspection data. Each location attribute may have multiple component attributes associated therewith, and each component attribute may have multiple observation code attributes associated therewith. In addition, in some embodiments, at least some of the location attributes have one or more sub-locations associated therewith, and/or at least some of the component attributes have one or more sub-component attributes associated therewith, and/or at least some of the observation codes have one or more observation details associated therewith.

Figure 3:
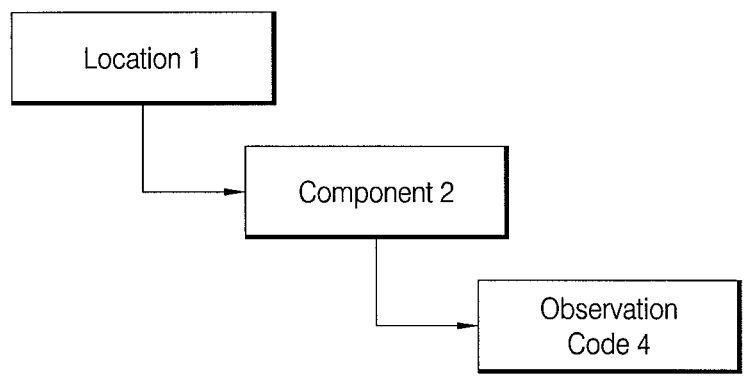
FIG. 3 is a database schematic showing an embodiment of an inspection record generated by an inspector using the inspection data represented by the database schematic of FIG. 2.

FIG. 3 is a database schematic showing an embodiment of an inspection record generated by an inspector using the inspection data represented by the database schematic of FIG. 2. During the inspection, from the data entry form generated based on the inspection data, the inspector has selected location 1, component 2, and observation code 4. As shown, the data structure of the inspection record shown in FIG. 3 is based on the data structure of the inspection data shown in FIG. 2. As seen, because the inspection data generated by the administrator is used to generate the data entry form used by the inspector, the inspection record generated by the inspector has content and a format influenced or determined by the administrator.

Figure 4:
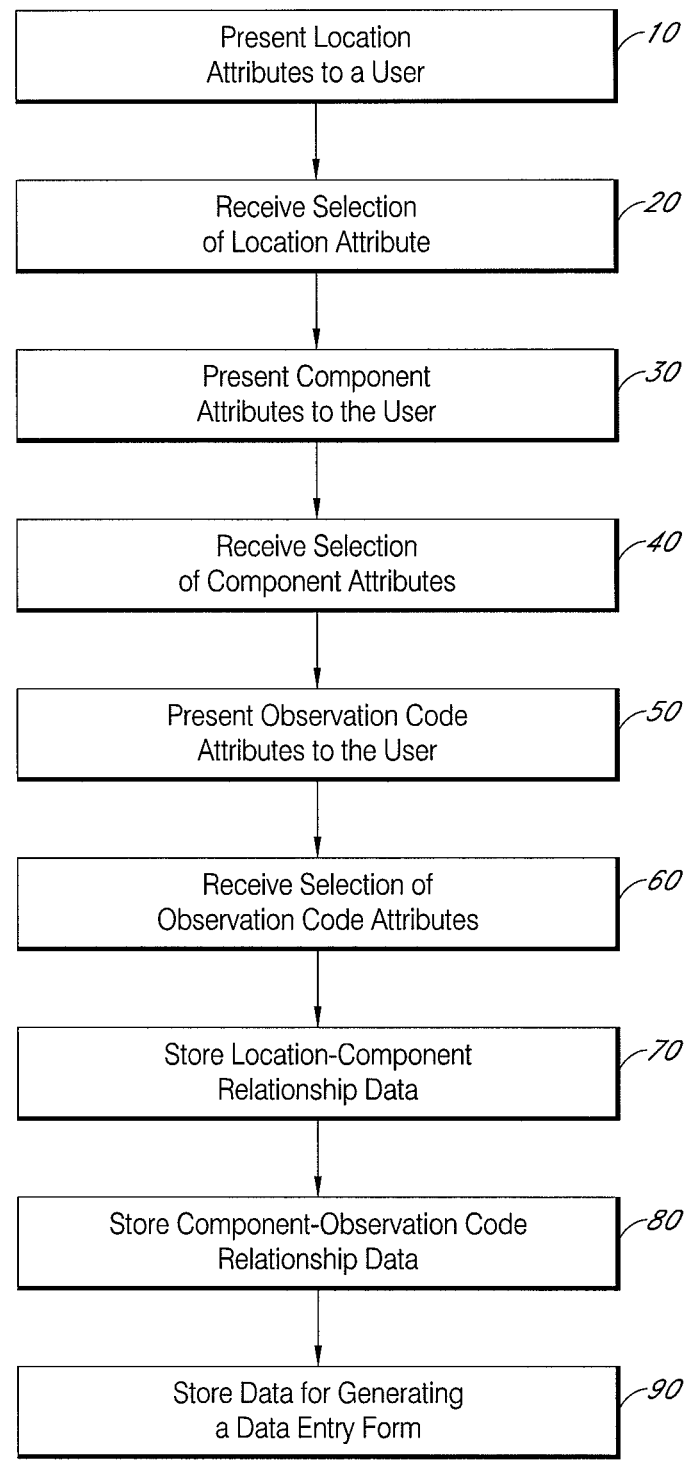
FIG. 4 is a flowchart showing a method of generating inspection data.

FIG. 4 is a flowchart showing a method of generating inspection data. Once generated and stored, the inspection data can be used by an inspector to record observations of an inspection site. The generated inspection data includes lists of attributes, observation codes, and relationships between the attributes and observations codes. During an inspection, the inspector accesses the inspection data to generate a data entry form which reflects the attributes, observation codes, and the relationships chosen during the inspection data generation.

Because each of the observations made at the time of inspection will be associated with a location, the generated inspection data includes one or more location attributes. In step 10, in order for a user, such as an administrator to select the location attributes for the inspection data, a plurality of selectable location attributes are presented. For construction inspections, the selectable location attributes may, for example, include such locations as: attic, basement, bathroom, bedroom, etc. For other types of inspections, other appropriate locations are used. In step 20, the system receives a selection of one or more of the location attributes. In response to the selection, the system stores the selected location attribute in the inspection data. In some embodiments, selectable sub-location attributes may be similarly presented and selected. For example, a basement location could have sub-location attributes of bathroom and bedroom. In some embodiments, the selectable sub-location attributes are presented because of their relationship with the selected location attribute, and certain other sub-location attributes available to the system are not presented. In some embodiments, certain location attributes have sub-location attributes which are automatically selected by the system. In some embodiments, one or more location attributes have sub-location attributes which are required.

Because each of the observations made by the inspector will be associated with a component, the generated inspection data includes one or more component attributes. In step 30, a plurality of selectable component attributes are presented to the user. For construction inspections the selectable component attributes may, for example, include such component attributes as: window, door, drywall, chimney, etc. For other types of inspections, other appropriate component attributes are used. In some embodiments, the selectable component attributes are presented because of their relationship with the selected location attribute, and certain other component attributes available to the system are not presented. In step 40, the system receives a selection of one or more of the component attributes. In response to the selection, the system stores the selected component attribute in the inspection data. In some embodiments, selectable sub-component attributes may be similarly presented and selected. For example, a window component attribute could have sub-component attributes of exterior and interior. In some embodiments, the selectable sub-component attributes are presented because of their relationship with the selected component attribute, and certain other sub-component attributes available to the system are not presented. In some embodiments, certain component attributes have sub-component attributes which are automatically selected by the system. In some embodiments, one or more components have sub-components which are required.

Because each of the observations made by the inspector will be associated with an observation code, the generated inspection data includes one or more observation codes. In step 50, a plurality of selectable observation code attributes are presented to the user. For construction inspections the selectable observation code attributes may, for example, include such observation code attributes as: wall framing warped, water stain/intrusion, air gap, etc. For other types of inspections, other appropriate observation code attributes are used. In some embodiments, the selectable observation code attributes are presented because of their relationship with the selected component attribute, and certain other observation code attributes available to the system are not presented. In step 60, the system receives a selection of one or more of the observation code attributes. In response to the selection, the system stores the selected observation code attributes in the inspection data. In some embodiments, selectable observation detail attributes may be similarly presented and selected. For example, an air gap observation code could have observation detail attributes of width and length. In some embodiments, the selectable observation detail attributes are presented because of their relationship with the selected observation code attributes and certain other observation detail attributes available to the system are not presented. In some embodiments, certain observation code attributes have observation details which are automatically selected by the system. In some embodiments, one or more observation code attributes have observation detail attributes which are required.

Because in some embodiments each of the observations made by the inspector will be associated with an observation code, because the observation code will be associated with a component (or sub-component), and because the component will be associated with a location (or sub-location), the inspection data includes relationships between the selected observation code attributes and the selected component attributes, and between the selected component attributes and the selected location attributes. In step 70, the system stores in the inspection data, location-component relationship information identifying relationships between each of the selected location attributes and one or more of the selected component attributes. Similarly, in step 80, the system stores in the inspection data, component-observation code relationship information identifying a relationship between each of the selected component attributes and one or more of the selected observation code attributes.

The stored inspection data can be used, when desired by an inspector, to generate a data entry form having fields based on the selected location attributes, the selected component attributes, the selected observation code attributes, the location-component relationship information, and the component-observation code relationship information. The data entry form can be used by the inspector to enter observation data for an inspection based on the selections made at the time of generating the inspection data.

Figure 5:
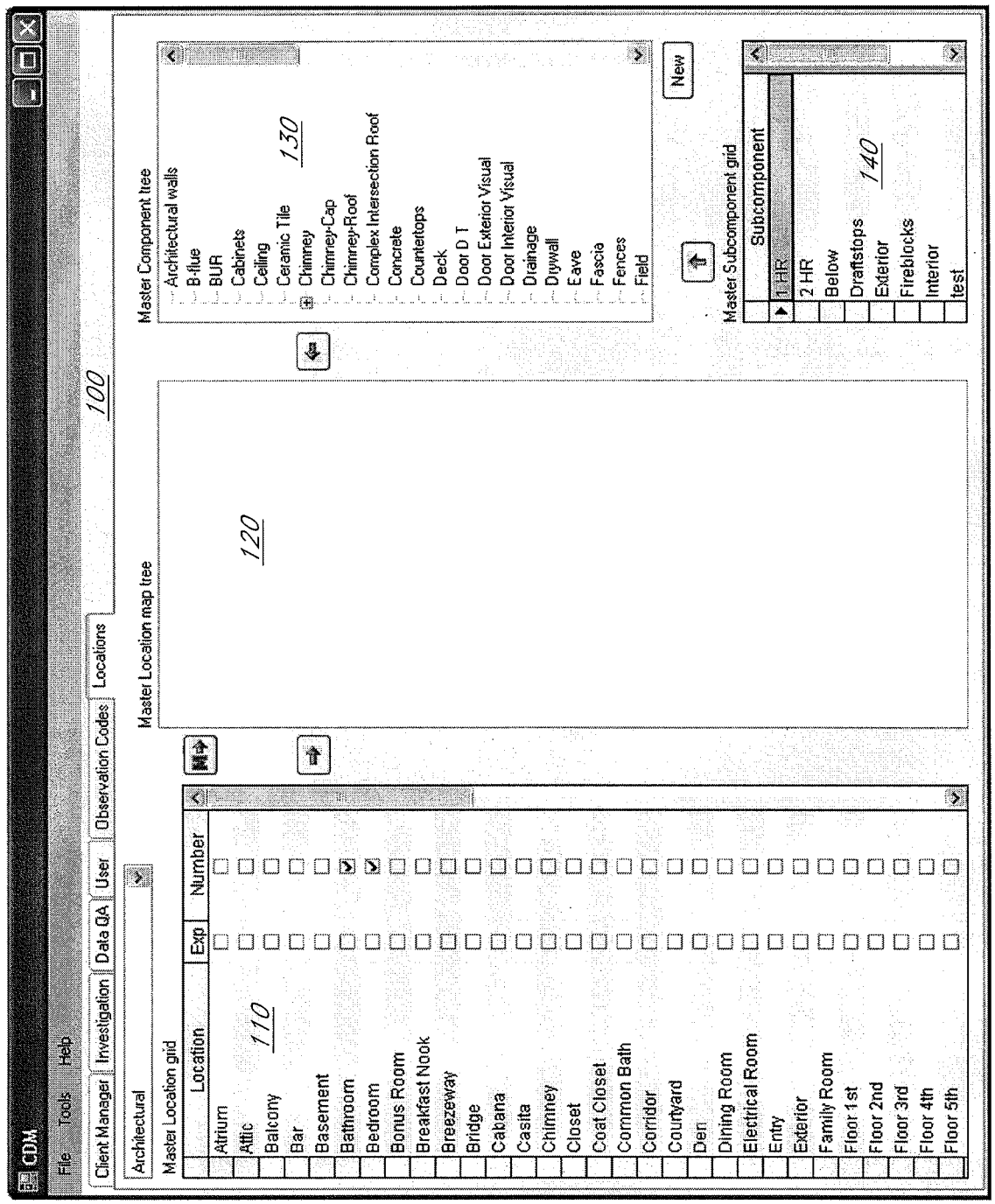
FIGS. 5-9 are screen shots of a selection screen showing a process of selecting inspection data.

FIG. 5 is a screen shot of an embodiment of a selection screen 100 used by the administrator for the selection of location attributes, sub-location attributes, component attributes, and sub-component attributes to generate the inspection data. In the displayed embodiment, selection screen 100 has a master location grid 110, a master location map tree 120, a master component tree 130, and a master subcomponent grid 140. The data displayed in the master location grid 110, the master component tree 130, and the master subcomponent grid 140 has been previously entered. The data may be modified or customized as desired, for example, so that the selection screen 100 displays data appropriate for generating inspection data for different types of inspections.

The master location map tree 120 displays the selected location attributes, sub-location attributes, component attributes, and sub-component attributes. As shown in FIG. 5, there are no selected attributes.

The master location grid 110 displays the selectable location attributes. In addition, once a location attribute is selected, a sub-location attribute may be selected from the master location grid 110 for the selected location attribute. In some embodiments, if a selected location attribute is highlighted, the master location grid 100 displays certain location attributes available to the system for possible selection as a sub-location attribute for the highlighted location attribute and does not display other location attributes available to the system.

The master component tree 130 displays the selectable component attributes. In addition, in some embodiments, once a component attribute is selected, a sub-component attribute may be selected from the master component tree 130 for the selected component attribute. In some embodiments, if a selected component attribute is highlighted, the master component tree 130 displays certain component attributes available to the system for possible selection as a sub-component attribute for the highlighted component attribute and does not display other component attributes available to the system.

The master subcomponent grid 140 displays the selectable sub-component attributes. In this embodiment, once a component attribute is selected, a sub-component attribute may be selected from the master subcomponent grid 140 for the selected component attribute. In some embodiments, if a selected component attribute is highlighted, the master subcomponent grid 140 displays certain component attributes available to the system for possible selection as a sub-component attribute for the highlighted component attribute and does not display other sub-component attributes available to the system.

FIGS. 5-9 are screen shots of the selection screen 100 showing a process of selecting location attributes, sub-location attributes, component attributes, and sub-component attributes for the inspection data.

Figure 6:
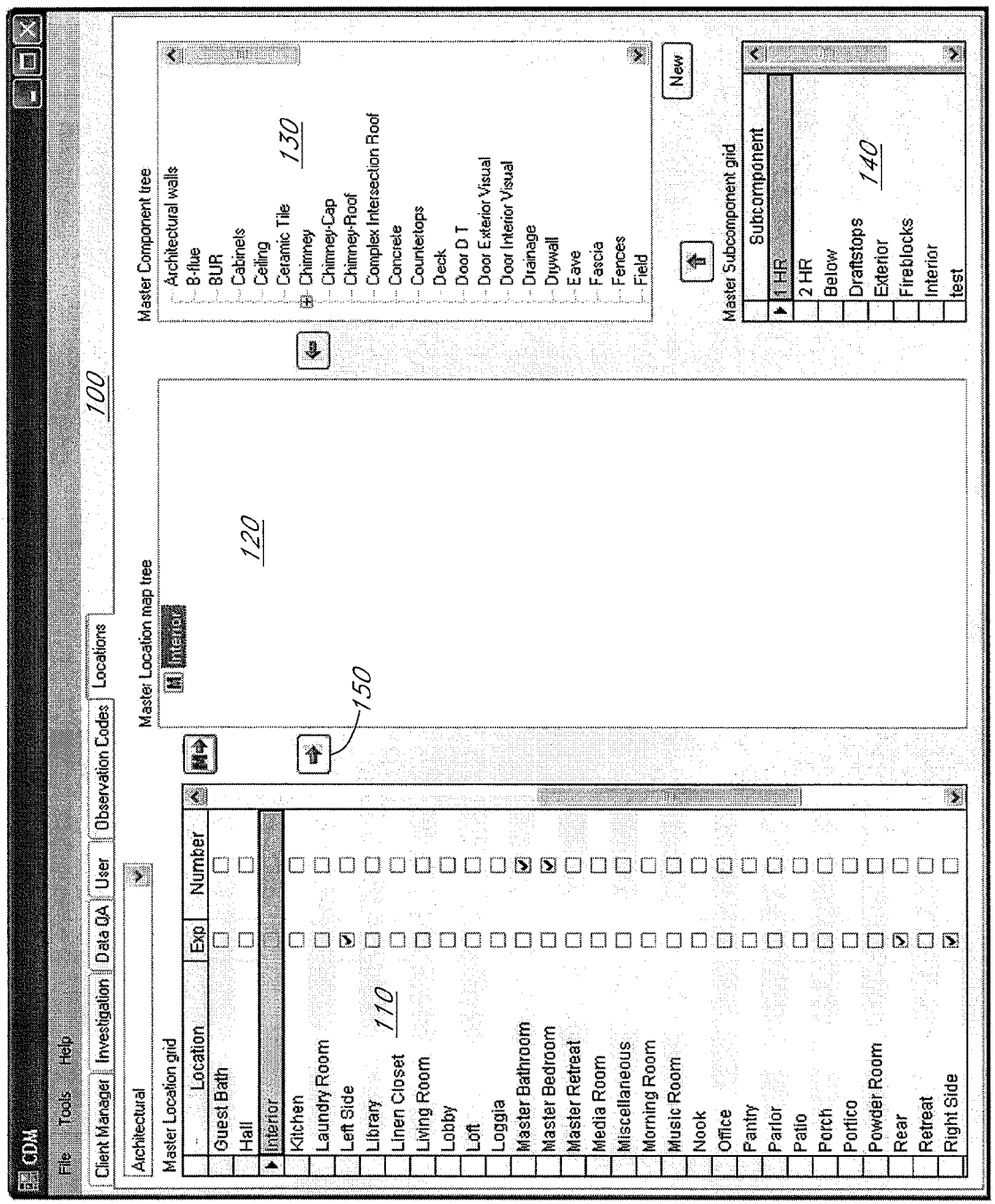

FIG. 6 shows the selection screen 100 having a selected location attribute called "interior" shown in the master location map tree 120. In this embodiment, the selection of interior occurs by highlighting through, for example, mouse clicking the "interior" location attribute in the master location grid 110 and mouse clicking or otherwise activating the arrow 150. In this embodiment, activating the arrow 150 results in the interior location attribute being stored in the inspection data, and the interior location attribute being displayed in the master location map tree 120.

Figure 7:
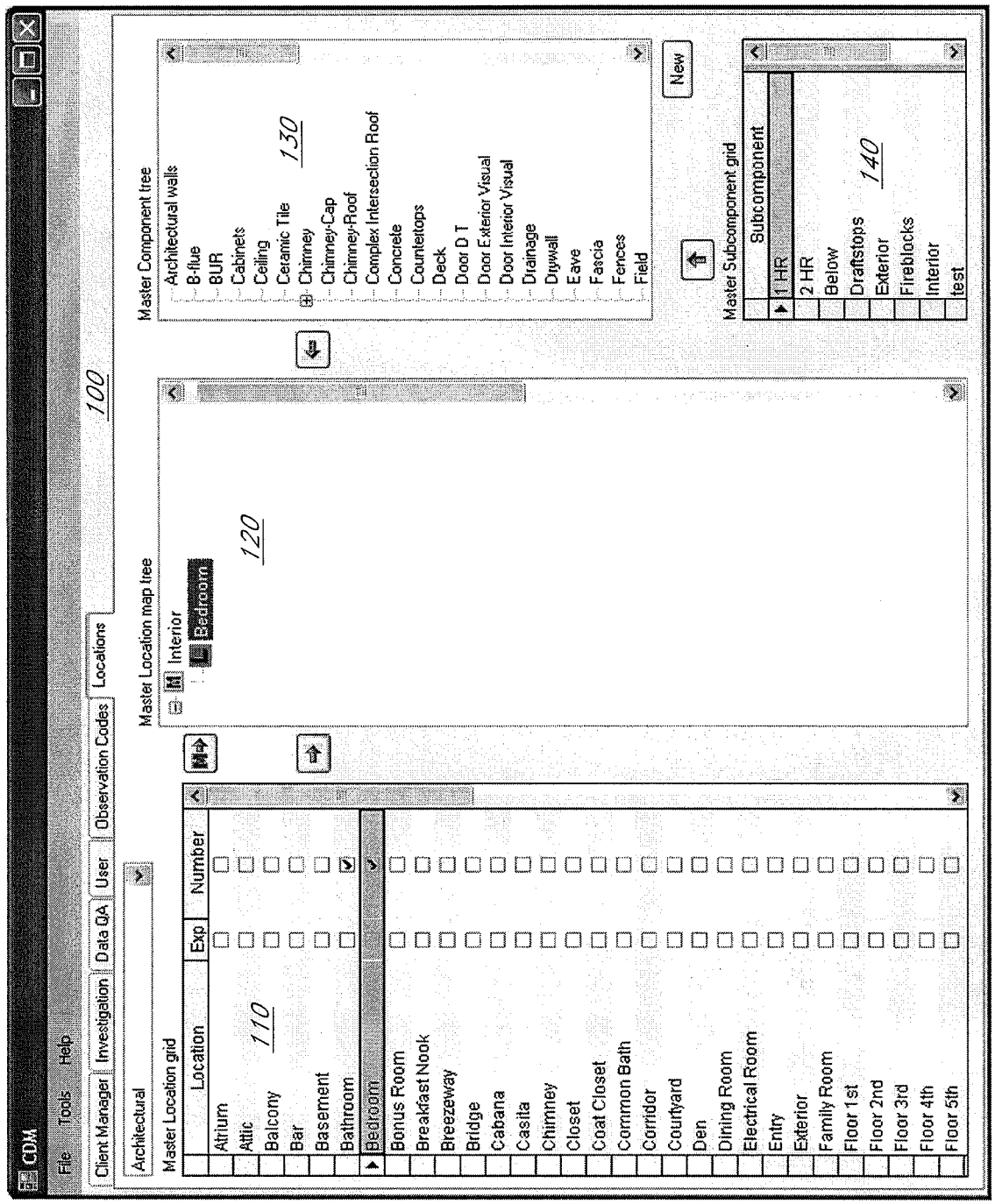

FIG. 7 shows the selection screen 100 having selected location attribute interior and a selected sub-location attribute bedroom shown in the master location map tree 120. In this embodiment, the selection of the sub-location attribute bedroom occurs by highlighting the interior location attribute in the master location map tree 120, highlighting the bedroom location attribute in the master location grid 110, and mouse clicking or otherwise activating the arrow 150. In this embodiment, activating the arrow 150 results in the bedroom sub-location attribute being stored in the inspection data, a location/sub-location relationship between the interior location and bedroom sub-location being stored in the inspection data, and the bedroom sub-location attribute being displayed in the master location map tree 120 so as to indicate the location/sub-location relationship between the interior location and the bedroom sub-location.

Figure 8:
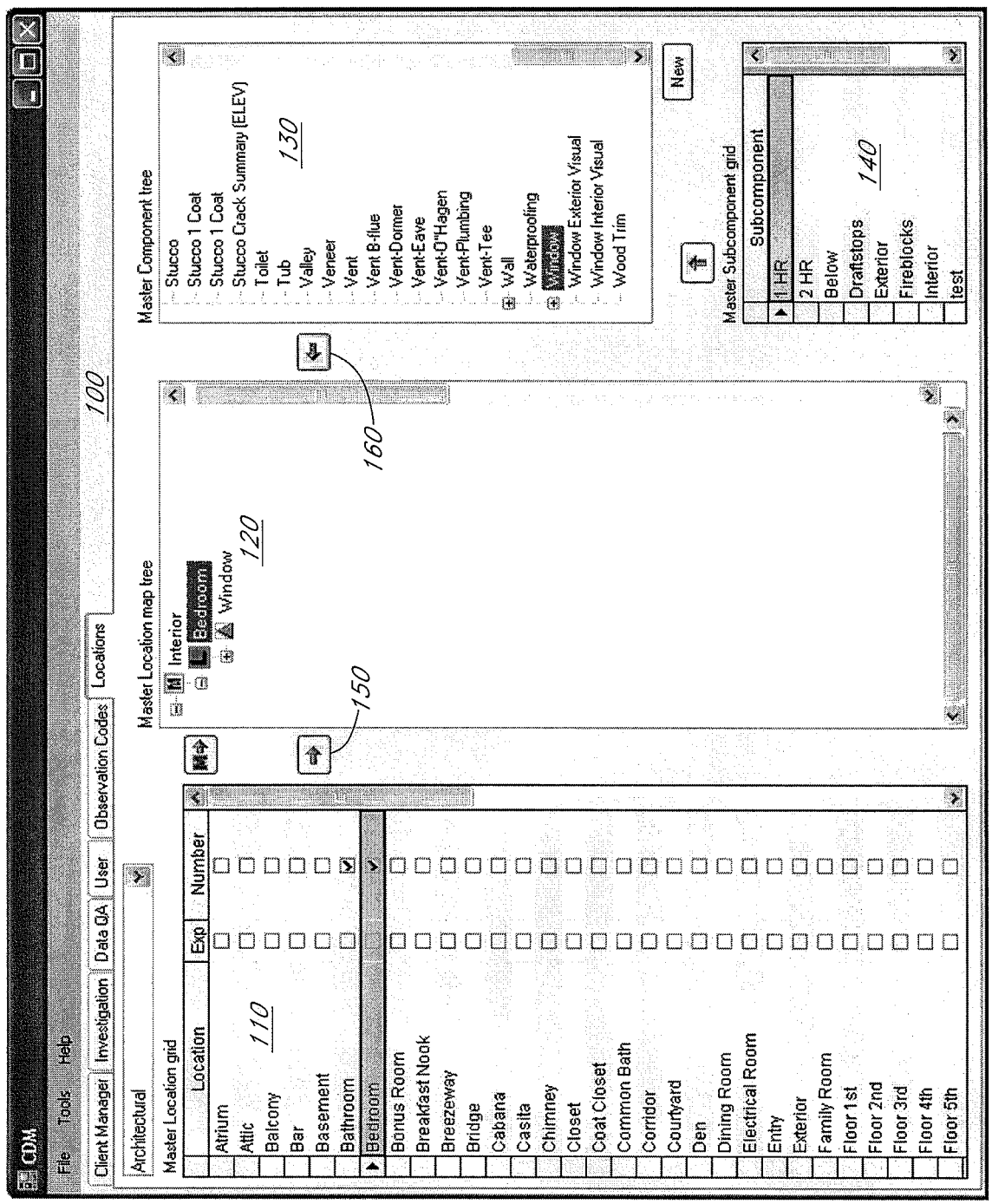

FIG. 8 shows the selection screen 100 having selected location attribute interior, selected sub-location bedroom, and a selected component attribute window shown in the master location map tree 120. In this embodiment, the selection of the component attribute window occurs by highlighting the bedroom sub-location attribute in the master location map tree 120, highlighting the window component attribute in the master component tree 130, and mouse clicking or otherwise activating the arrow 160. In this embodiment, activating the arrow 160 results in the window component attribute being stored in the inspection data, a sub-location/component relationship between the bedroom sub-location and window component being stored in the inspection data, and the window component attribute being displayed in the master location map tree 120 so as to indicate the sub-location/component relationship between the bedroom sub-location and the window component.

Figure 9:
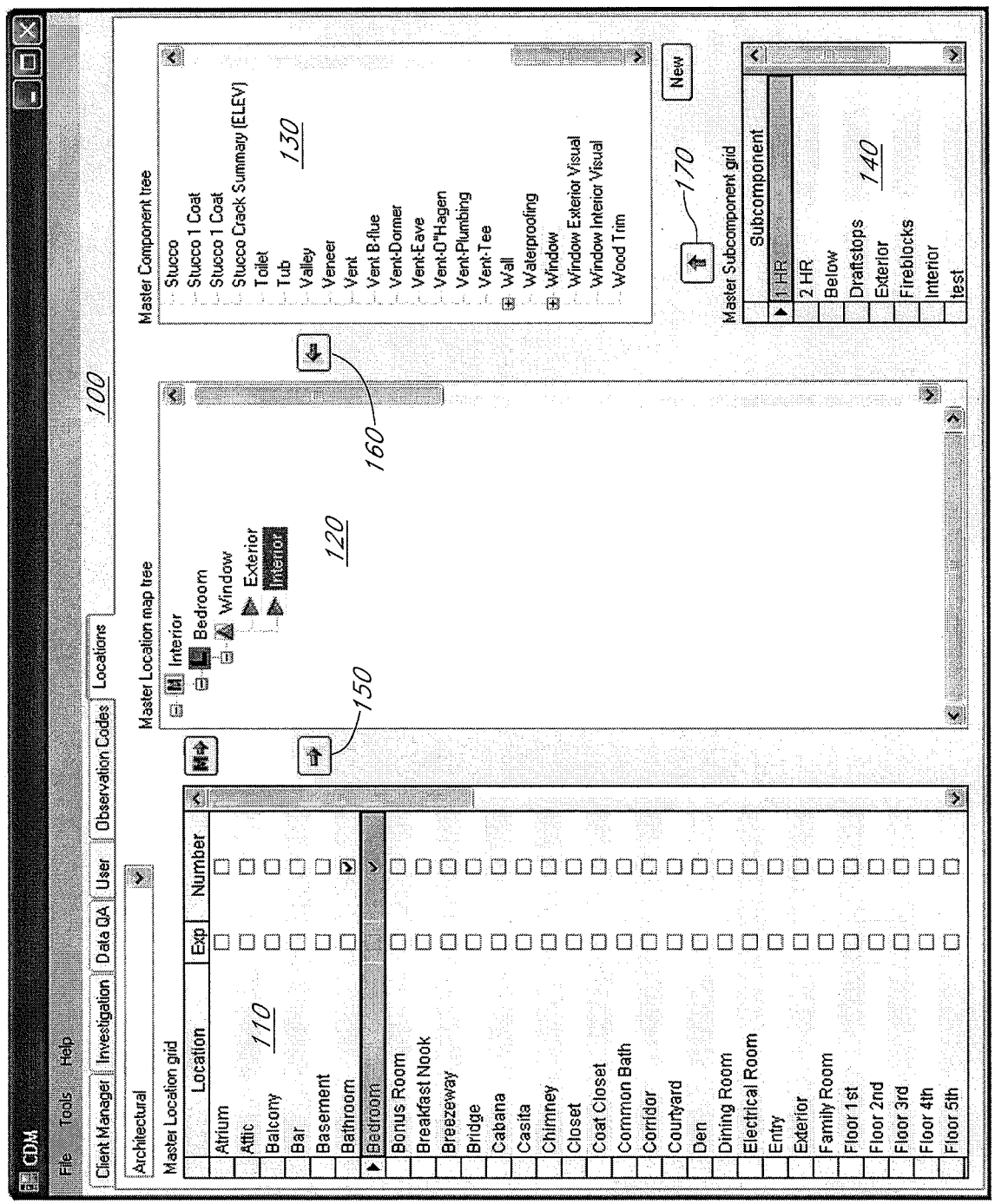

FIG. 9 shows the selection screen 100 having selected location attribute interior, selected sub-location bedroom, selected component attribute window, and selected sub-component attributes exterior and interior shown in the master location map tree 120. In this embodiment, the selection of the sub-component attributes exterior and interior occurs automatically because of the selection of the window component. Therefore, in this embodiment, activating the arrow 160 to select the window component attribute discussed above, also results in the exterior and interior sub-component attributes being stored in the inspection data, a component/sub-component relationship between the window component and each of the exterior and interior sub-components being stored in the inspection data, and the exterior and interior sub-component attributes being displayed in the master location map tree 120 so as to indicate the component/sub-component relationships between the window component and each of the exterior and interior sub-components.

For some embodiments, selection of a sub-component may occur by highlighting the component attribute in the master location map tree 120, highlighting the sub-component attribute in the master subcomponent grid 170, and mouse clicking or otherwise activating the arrow 170. For such components, activating the arrow 170 results in the component attribute being stored in the inspection data, a component/sub-component relationship between the component and sub-component being stored in the inspection data, and the sub-component attribute being displayed in the master location map tree 120 so as to indicate the component/sub-component relationship between the component and sub-component.

For some embodiments, activating arrow 170 results in the establishment of a component/sub-component relationship between a highlighted component attribute from the master component tree 130 and a highlighted sub-component from the master subcomponent grid 140. Where such a relationship has been established, activating the arrow 160 with the component attribute highlighted results in both the component and sub-component attributes being stored in the inspection data, a component/sub-component relationship between the component and sub-component being stored in the inspection data, and the component and sub-component attributes being displayed in the master location map tree 120 so as to indicate the component/sub-component relationship between the component and the sub-component.

Figure 10:
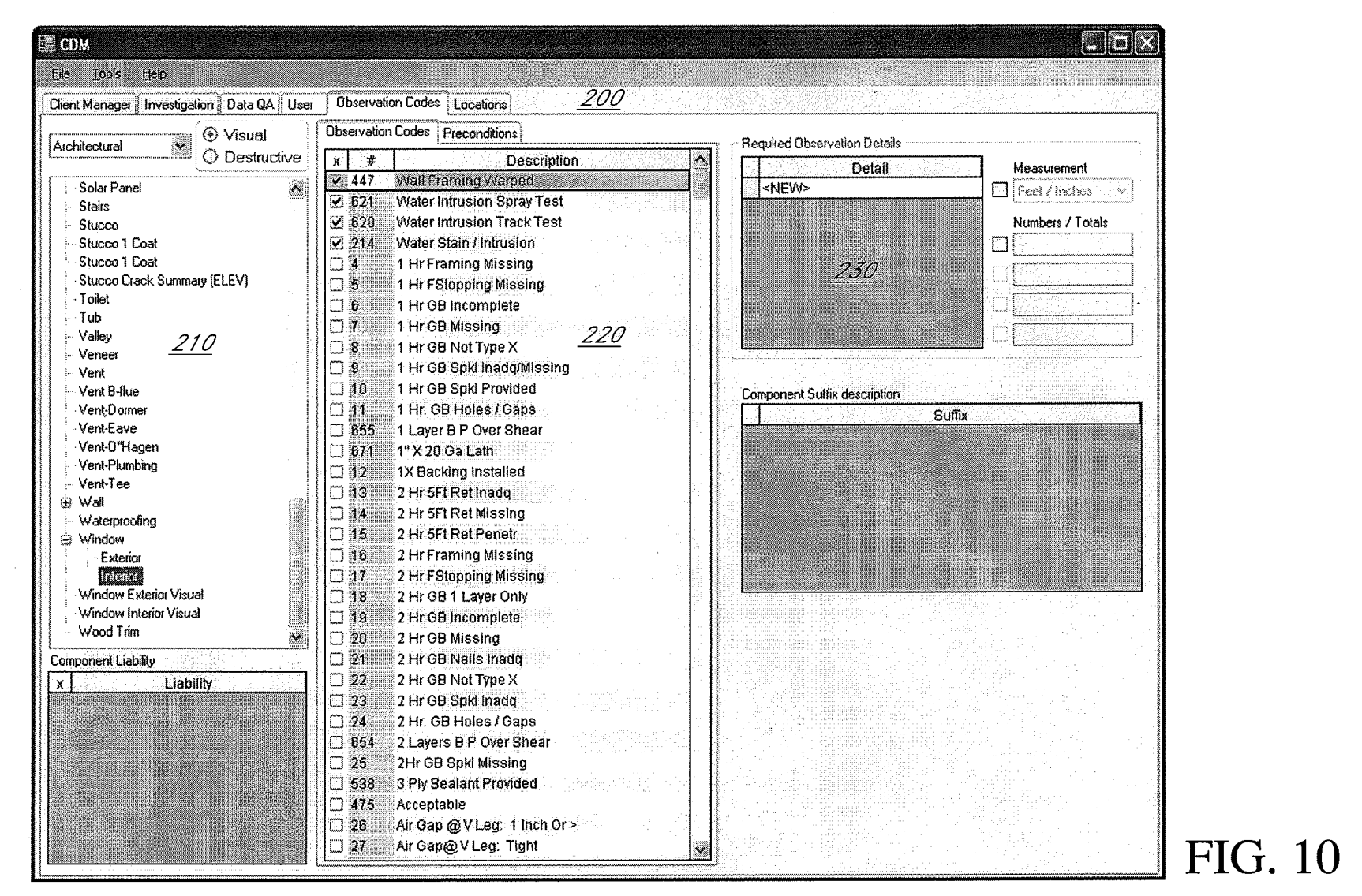

FIG. 10 is a screen shot of an embodiment of a selection screen 200. In the displayed embodiment, selection screen 200 has a component tree 210, an observation code grid 220, and an observation detail grid 230. Selection screen 200 may be used for the selection of observation codes for selected components and sub-components, and for the selection of observation details for selected observation codes.

The component tree 210 displays the components and sub-components previously selected as described above. In the observation code grid 220, the selectable observation codes are displayed. In this embodiment, to select observation codes for a selected component or sub-component, a user highlights a desired selected component or sub-component in the component tree 210 and mouse clicks or otherwise activates the box next to the desired observation code. The box activation results in the observation code being stored in the inspection data, a component/observation code relationship being stored in the inspection data, and a check mark being displayed in the activated box to indicate that the checked observation code is associated with the highlighted selected component or sub-component. As shown in FIG. 10, the interior sub-component of the window component has four observation codes associated therewith: wall framing warped, water intrusion spray test, water intrusion track test, and water stain/intrusion. Also shown are numerous other observations not associated with the interior sub-component of the window component, but selectable so as to be associated with the interior sub-component of the window component.

The observation detail grid 230 displays observation details. In this embodiment, to select observation details for a selected observation code, the desired selected observation code is highlighted, and observation details can be selected from a list (not shown) or may be entered in the observation detail grid 230. Once entered or selected, the observation details are stored in the inspection data, and an observation code/observation detail relationship is stored in the inspection data.

Figure 11:
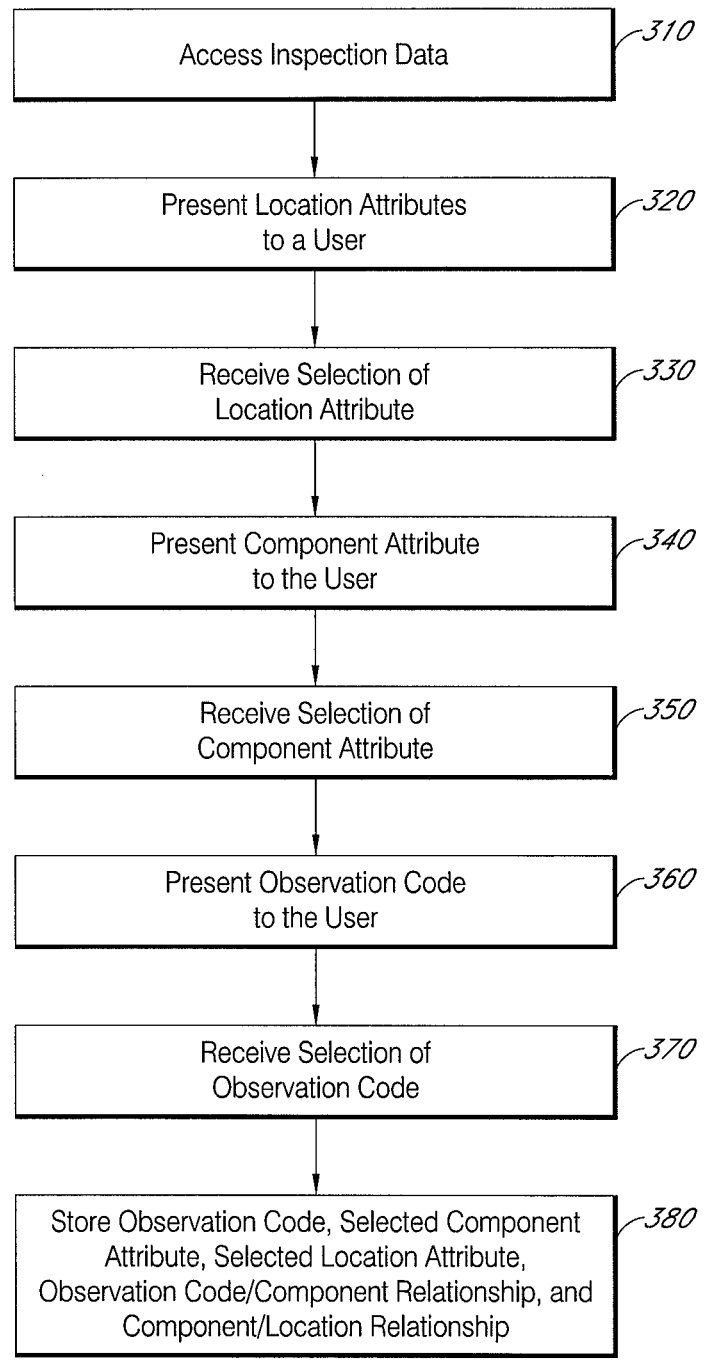
FIG. 11 is a flowchart showing a method of recording observations of an inspection site using inspection data created using a method such as that shown in FIG. 1.

FIG. 11 is a flowchart showing a method of recording observations of an inspection site using inspection data created using a method such as that shown in FIG. 4. Once generated and stored, the record of the observations can be used by an inspector or others to understand the state of the observation site at the time of inspection. The record includes observation codes and attributes, such as component and location attributes, and relationships between the observations codes and the attributes. During an inspection, the inspector invokes an application which accesses the inspection data to generate a data entry form comprising multiple graphical interface screens, such as those shown in FIGS. 12-22 discussed below. The data entry form reflects the attributes, observation codes, and the relationships chosen by the administrator during the inspection data generation.

During the inspection, the observations of the inspection are guided by the inspection data. In step 310, the inspection data is accessed. In some embodiments, accessing the inspection data includes selecting the inspection data with an application on a computer which retrieves the inspection data from a database. In some embodiments, the inspection data is stored locally. In some embodiments, the inspection data is accessed by the computer over a network, such as the internet.

Because each of the observations made by the inspector is associated with a location, in step 320, a plurality of selectable location attributes are presented to the inspector. The location attributes presented to the inspector are presented as a result of the location attributes being included in the inspection data. In step 330, the system receives a selection of one or more of the location attributes. In response to the selection, the system stores the selected location attribute in the inspection record. In some embodiments, selectable sub-location attributes may be similarly presented and selected. For example, a basement location could have sub-location attributes of bathroom and bedroom. In some embodiments, the selectable sub-location attributes are presented as a result of their relationship with the selected location attribute, as stored in the inspection data.

Because each of the observations made by the inspector is associated with a component, in step 340, a plurality of selectable component attributes are presented to the inspector. The component attributes presented to the inspector are presented as a result of the component attributes being included in the inspection data and having a location/component relationship with the location attribute selected in step 330. In step 350, the system receives a selection of one or more of the component attributes. In response to the selection, the system stores the selected component attribute in the inspection record. In some embodiments, selectable sub-component attributes may be similarly presented and selected. For example, a window component attribute could have sub-component attributes of exterior and interior. In some embodiments, the selectable sub-component attributes are presented as a result of their relationship with the selected component attribute, as stored in the inspection data.

Because each of the observations made by the inspector is associated with an observation code, in step 360, a plurality of selectable observation code attributes are presented to the inspector. The component attributes presented to the inspector are presented because the component attributes are included in the inspection data and have a component/observation code relationship with the component attribute selected in step 350. Based on the inspector's observations of the inspection site, in step 370, the system receives from the inspector, a selection of one or more of the observation code attributes. For example, if the inspector observes an air gap at the inspection site, the inspector selects the air gap attribute. In response to the selection, the system stores the selected observation code attribute in the inspection record. In some embodiments, selectable observation detail attributes having relationships with the selected observation code, as stored in the inspection data, may be similarly presented. For example, an air gap observation code could have observation detail attributes of width and length. Based on the inspector's measurement of width and length, the inspector enters values for the observation detail attributes of width and length.

Because each of the observation codes in the inspection data are associated with a component (or sub-component), and because each component in the inspection data is associated with a location (or sub-location), the associations or relationships are available for inclusion in the inspection record. In step 380, the system stores in the inspection record, component/observation code relationship information identifying a relationship between each of the selected observation codes and the component attribute associated with the selected observation codes, and location/component relationship information identifying a relationship between each of the selected component attributes and the location attribute associated with the selected component attributes.

As the inspection continues, the inspector may repeatedly select locations, components associated in the inspection data with the selected locations, and observations codes associated in the inspection data with the selected components. In some embodiments, the inspector can add to the inspection record locations, components, and observations codes which are not found in the inspection data. In some embodiments, additional locations, components, or observation codes may not be added to the inspection record.

In some embodiments, with the selection of a location (or sub-location), a component (or sub-component), or an observation code (or observation detail), the inspector has the option, or is required, to add to the inspection record a graphic. The system records a graphic/location, graphic/component, or graphic/observation code relationship, etc., as appropriate. In some embodiments, at the selection of, for example, the location, the system enters a graphic input mode, and the inspector takes a picture with a camera connected to the computer. The picture taken by the inspector is recorded as the graphic associated with the selection, and the appropriate graphic relationship between the picture and the selection is recorded. In some embodiments, with the graphic of a selection displayed, the inspector has the option, or is required to make notes on the graphic.

For example, if an inspector observes an air gap, an air gap observation code is selected. In response, the inspector may be required to take a picture of the observed air gap. Once the picture is taken, the inspector may be required to input measurements of the width and length of the air gap as width and length observation details. In addition to the width and length observation details being entered, the inspector may have the option or may be required to annotate the picture of the air gap of the positions to indicate where the width and length were measured. The annotation is stored as separate data from the picture so that the picture data remains unchanged.

Figure 12:
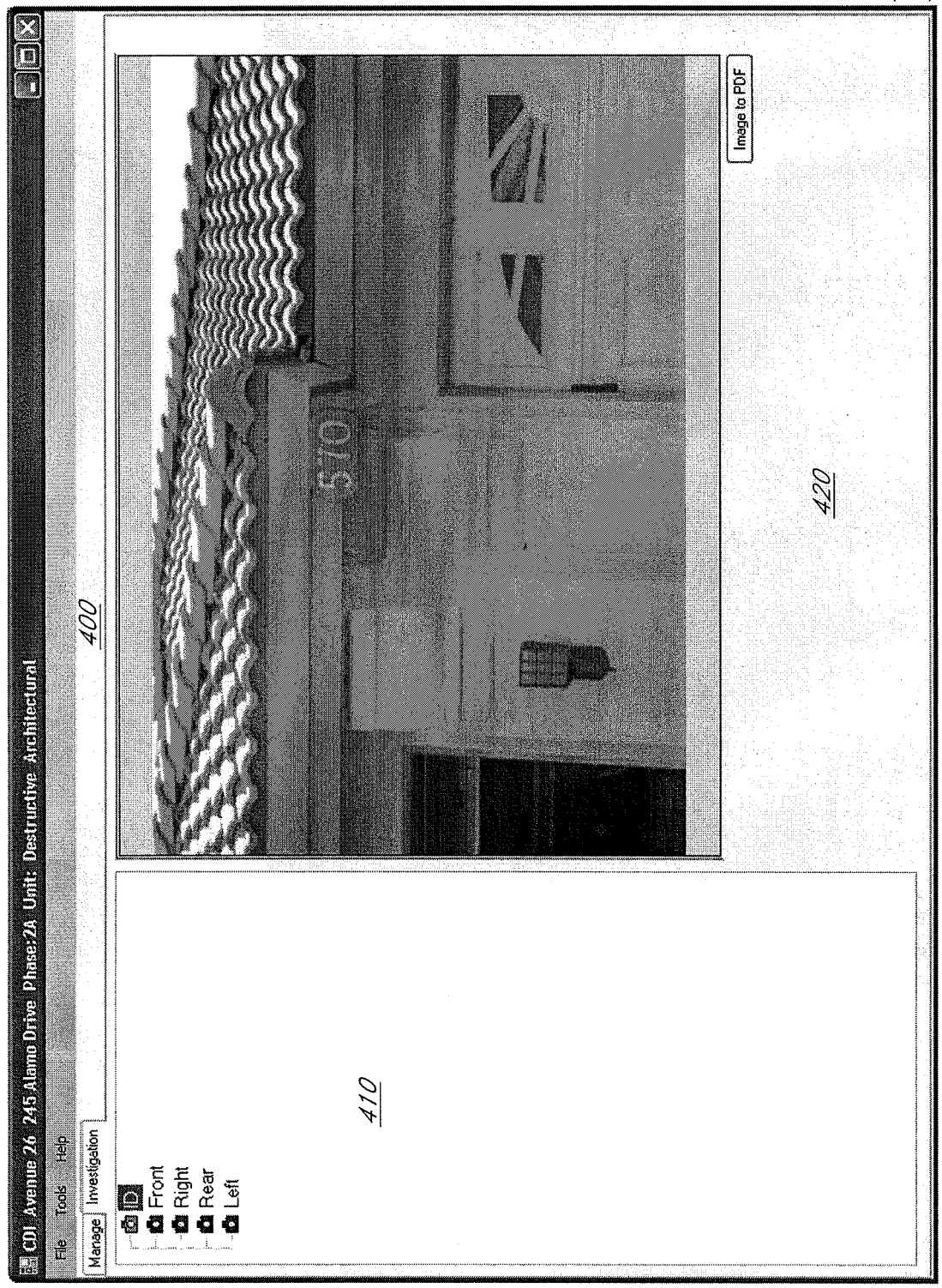
FIG. 12 is a screen shot of an embodiment of an inspection screen.

FIG. 12 is a screen shot of an embodiment of an inspection screen 400. In the displayed embodiment, inspection screen 400 has an inspection tree 410 and a graphic display 420.

The inspection screen 400 displays the location attributes, sub-location attributes, component attributes, and sub-component attributes selected for the investigation record from the inspection data. As shown in FIG. 12, at this point, there are no selected attributes. There are, however, required "inspection details" of ID, Front, Right, Rear, and Left. As shown, the ID inspection detail in this embodiment is associated with a picture of the inspection site showing the address of the inspection site. In some embodiments, the Front, Right, Rear, and Left inspection details are associated with pictures of the inspection site from sides corresponding to the inspection details.

FIGS. 13-19 are screen shots of the inspection screen 400 showing various steps or stages of an inspection.

Figure 13:
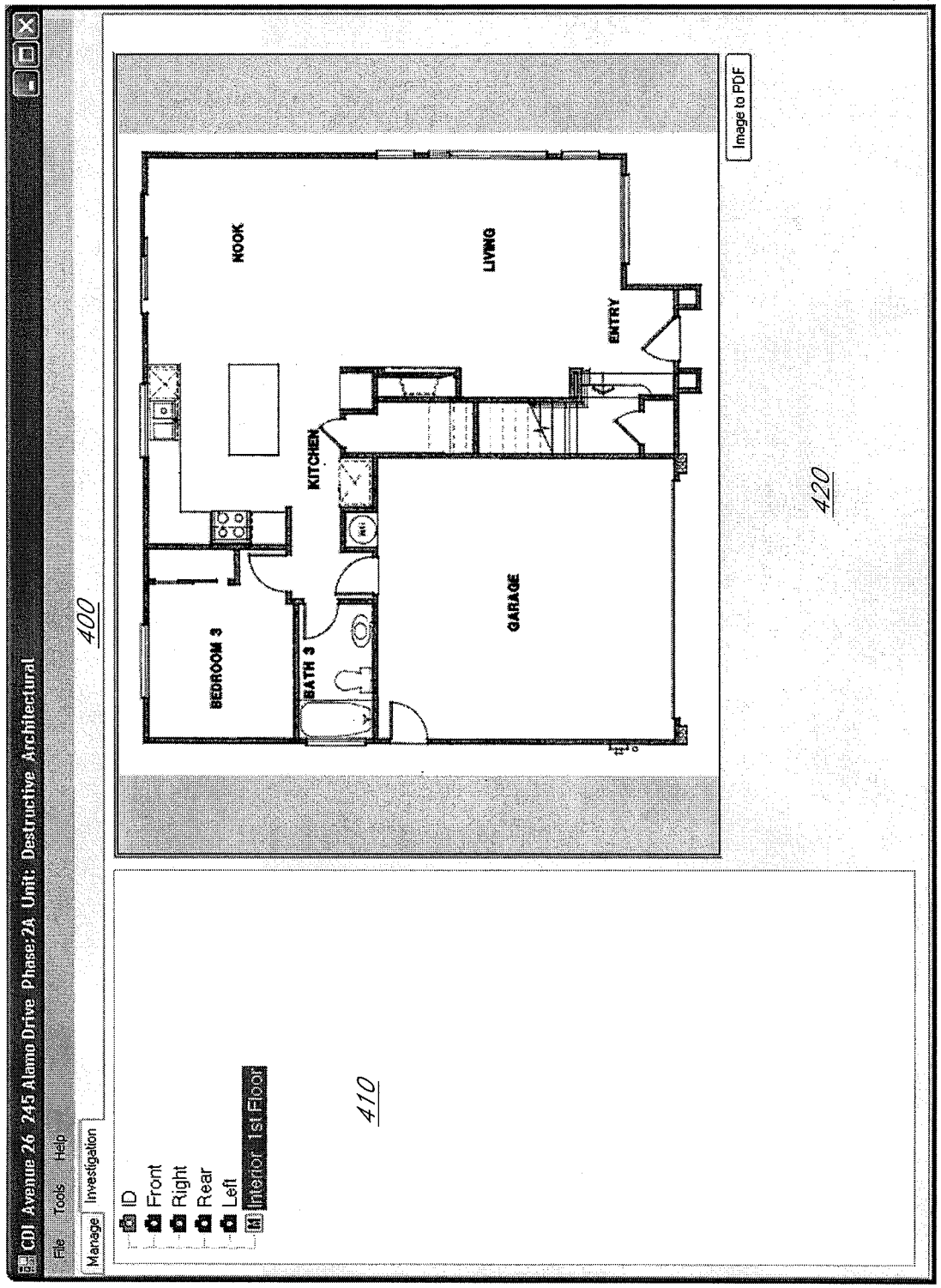
FIGS. 13-19 are screen shots of the inspection screen of FIG. 12 showing various steps or stages of an inspection.

FIG. 13 is a screen shot of inspection screen 400, where the inspector has added a location component interior $1^{st}$ floor from the inspection data and the interior $1^{st}$ floor is shown in the inspection tree 410. As shown in the graphic display 420, a graphic associated with the interior $1^{st}$ floor location has been added to the inspection record. In this embodiment, the graphic is a floor plan of the $1^{st}$ floor of the inspection site. Other graphics may alternatively or additionally be associated with the location attribute. In some embodiments, the inspector can rename components or add components not found in the inspection data.

Figure 14:
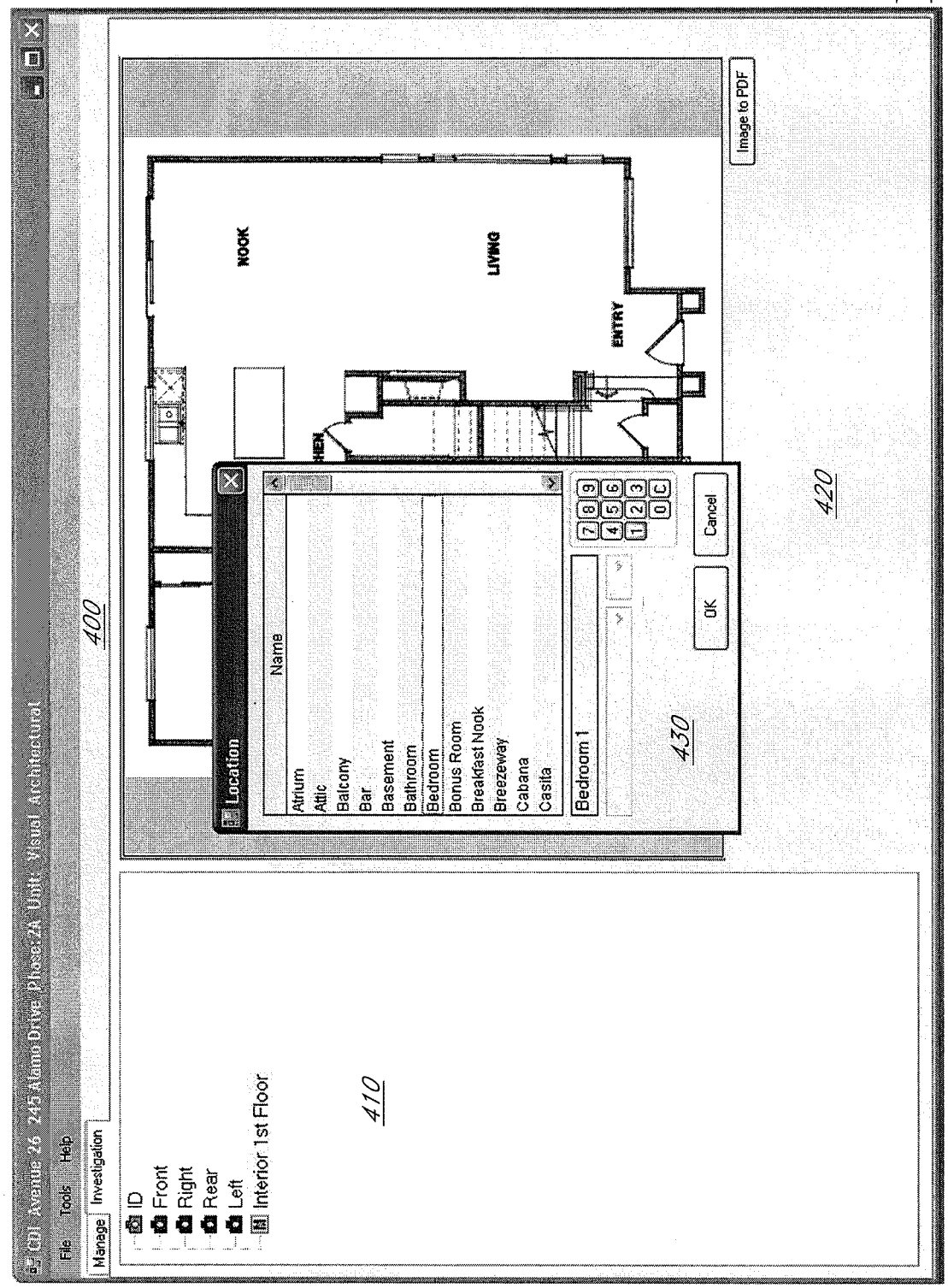
Figure 15:
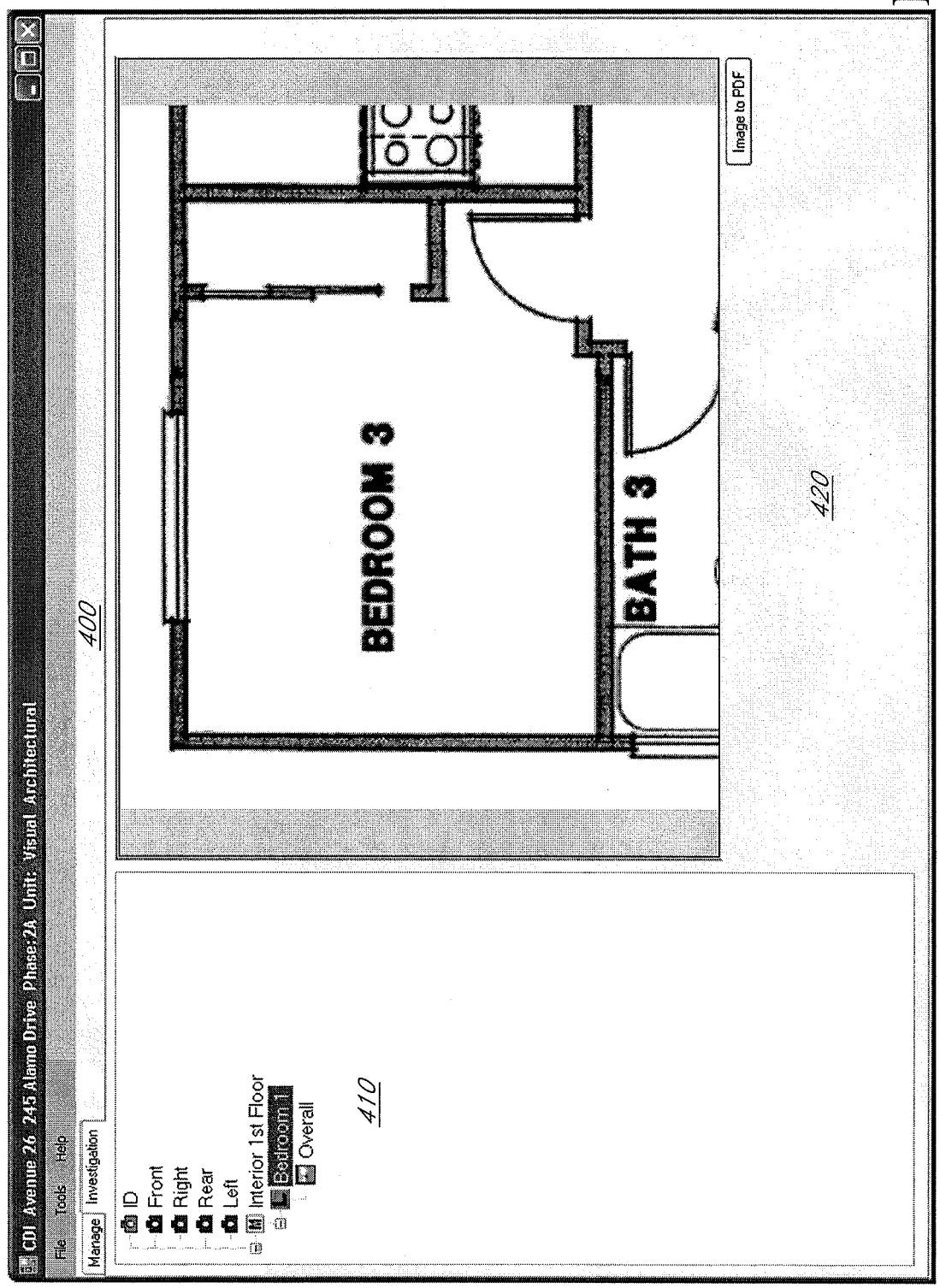

FIG. 14 is a screen shot of inspection screen 400, where the inspector has invoked a process for adding a sub-location attribute by, for example, right mouse clicking on the interior $1^{st}$ floor location attribute and selecting an add sub-location option from a menu (not shown). In response to the right mouse clicking, a location screen 430 is displayed. The inspector selects the bedroom sub-location attribute using the location screen 430, and in this example, titles the bedroom sub-location attribute bedroom 1. FIG. 15 is a screen shot of inspection screen 400 after the bedroom sub-location attribute has been selected. As shown in the inspection tree 410, the bedroom 1 sub-location attribute is displayed as being related to the interior $1^{st}$ floor location attribute. In this embodiment, as part of the sub-location attribute selection process, the inspector added a graphic associated with the bedroom 1 sub-location attribute. The inspector may, for example, add one or more graphics by using the camera as discussed above, or by accessing a local or remote database with, for example, pictures, drawings, and/or floor plans. In this example, the graphic, shown in graphic display 420, is a subsection of the floor plan of the $1^{st}$ floor of the inspection site. In some embodiments, in response to adding a sub-location attribute, the inspector has the option or is required to add a graphic associated with the sub-location, where the added graphic is a subset or a portion of the graphic associated with the location to which the sub-location is related. To accomplish this, in response to the addition of a sub-location attribute of a location attribute, the system displays the graphic associated with the location attribute. The inspector then indicates which area or areas of the graphic are to be used as the graphic of the sub-location attribute. Other graphics may alternatively or additionally be associated with the sub-location attribute.

Figure 16:
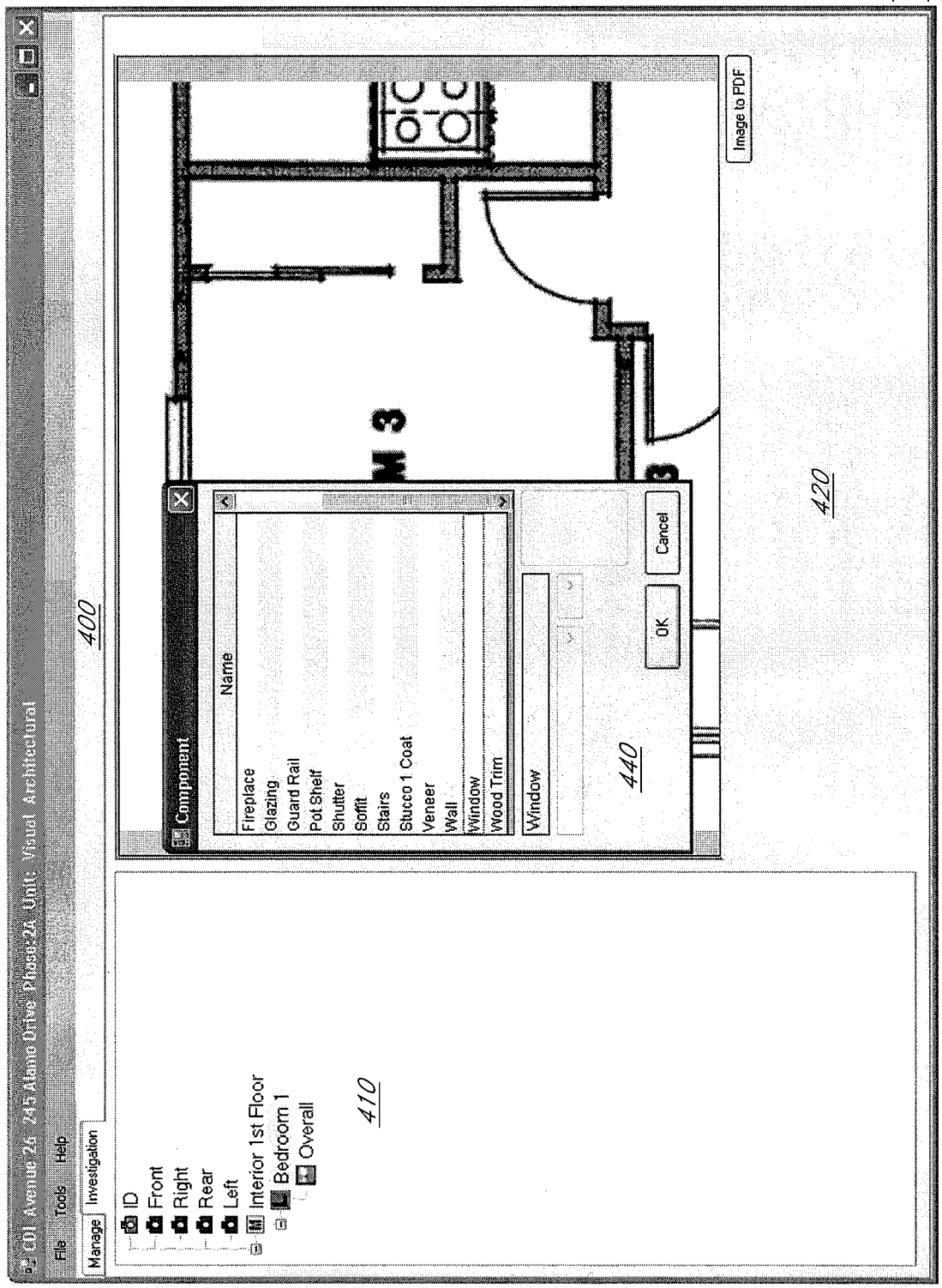
Figure 17:
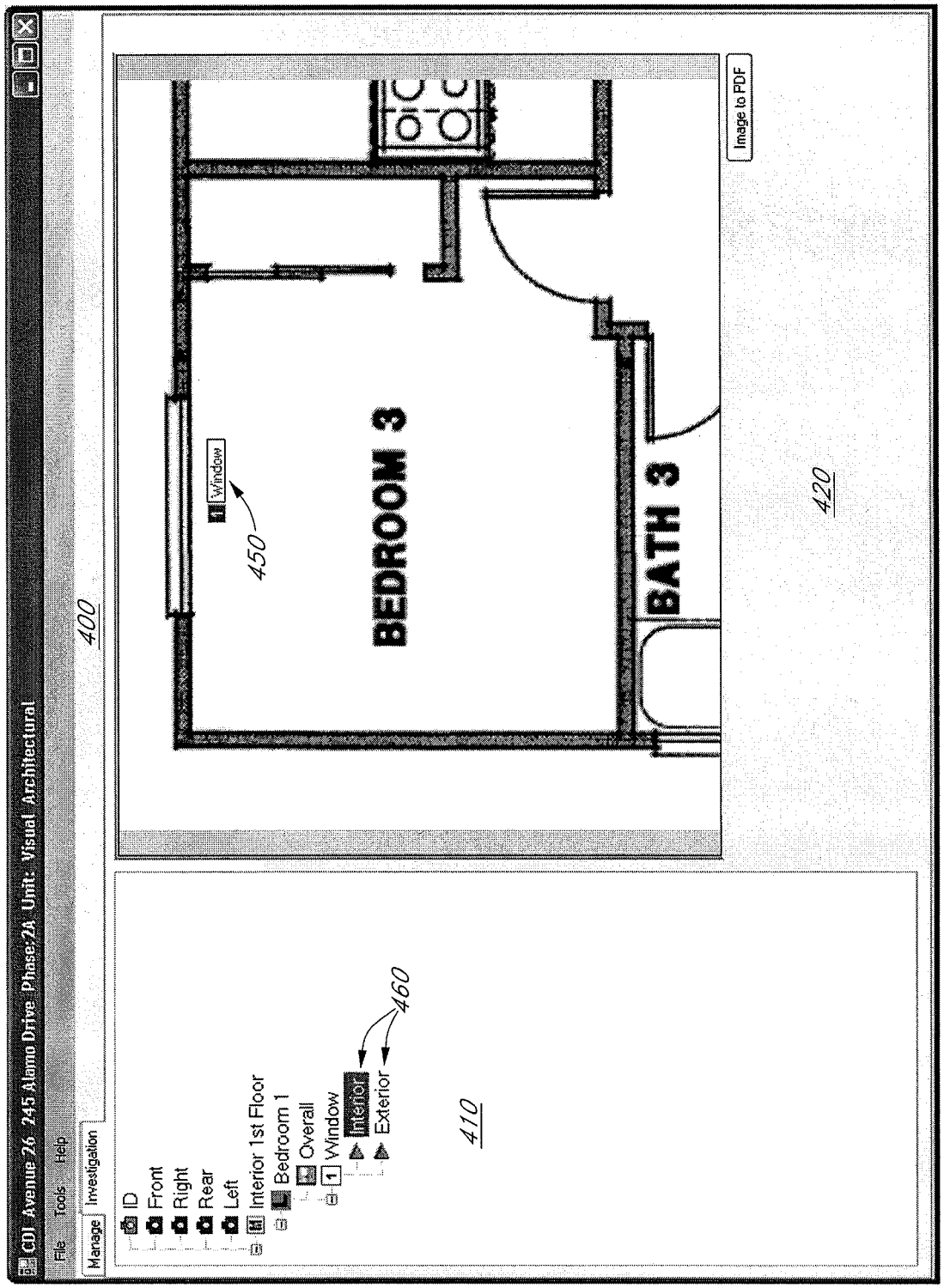

FIG. 16 is a screen shot of inspection screen 400, where the inspector has invoked a process for adding a component attribute by, for example, right mouse clicking on the bedroom 1 sub-location attribute and selecting an add component option from a menu (not shown). In response to the right mouse clicking, a component screen 440 is displayed. The inspector selects the window component attribute using the component screen 440, and in this example, titles the window component attribute window. FIG. 17 is a screen shot of inspection screen 400 after the window component attribute has been selected. As shown in the inspection tree 410, the window component attribute is displayed as being related to the bedroom 1 sub-location attribute. In this embodiment, as part of the component attribute selection process, the inspector added a graphic associated with the window component attribute. In this example, the graphic, shown in graphic display 420, is an annotation 450 on the graphic associated with the sub-location attribute bedroom 1, which is the subsection of the floor plan of the 1$^{st}$ floor of the inspection site. In some embodiments, when adding a component attribute, the inspector has the option or is required to add a graphic associated with component, where the added graphic is an annotation of the graphic of the location or sub-location to which the component is related. Other graphics may alternatively or additionally be associated with the component attribute.

As shown in inspection tree 410 of FIG. 17, the window component has interior and exterior sub-component attributes 460. With the interior sub-component attribute selected the inspector can add an observation code based on an observation of the interior of the window.

Figure 18:
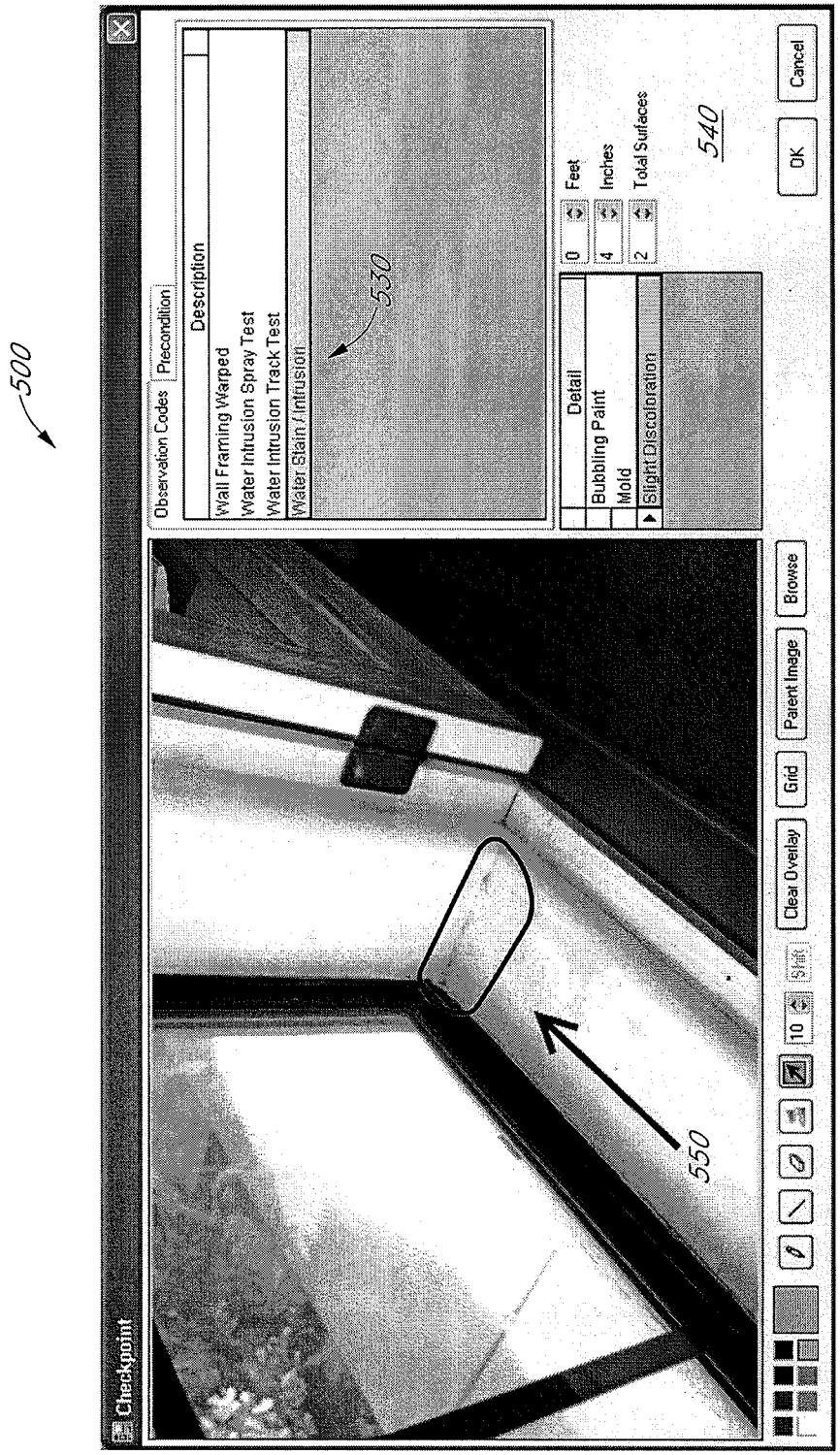
Figure 19:
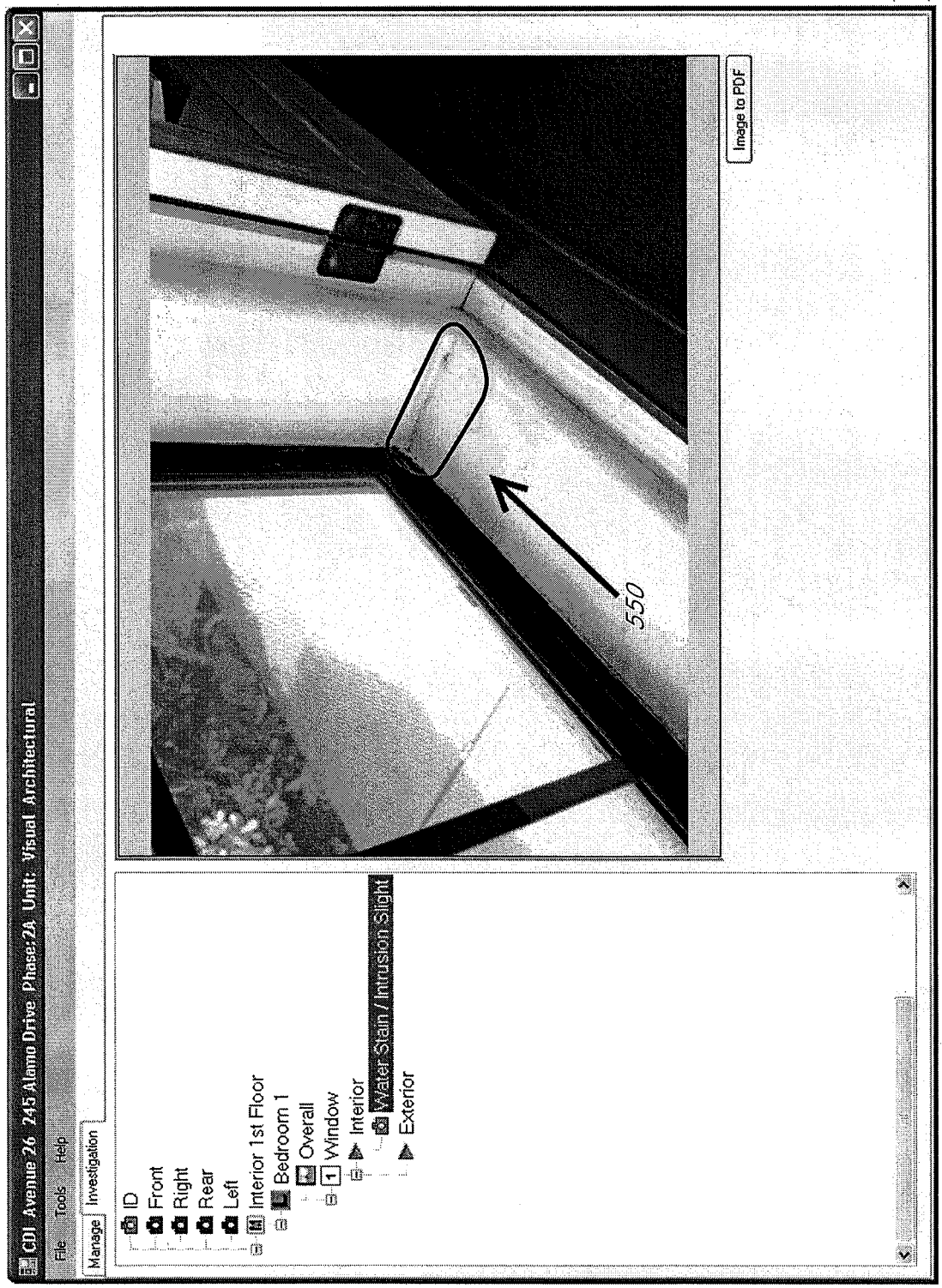

FIG. 18 is a screen shot of a checkpoint screen 500, invoked by the inspector adding observation codes and details by, for example, right mouse clicking on the interior sub-component attribute shown in FIG. 17 and selecting an add observation code option from a menu (not shown). In response to the right mouse clicking, component screen checkpoint screen 500 is displayed. In this embodiment, with the checkpoint screen 500 open, the inspector takes a picture of the interior of the window with the camera as describe above. The picture and its relationship to the interior sub-component attribute are automatically added to the inspection record and the picture is automatically shown in the graphic display 520. As shown in the observation code list 530, the inspector has selected the water stain/intrusion observation code attribute. In addition, observation detail attributes have been added to the detail display 540. Also shown is annotation 550, which highlights an area of interest on the picture related to the observation. In this example, evidence of the observed water intrusion is circled. FIG. 19 is a screen shot showing the inspection screen 400 after the observation code water stain/intrusion has been added.

Figure 20:
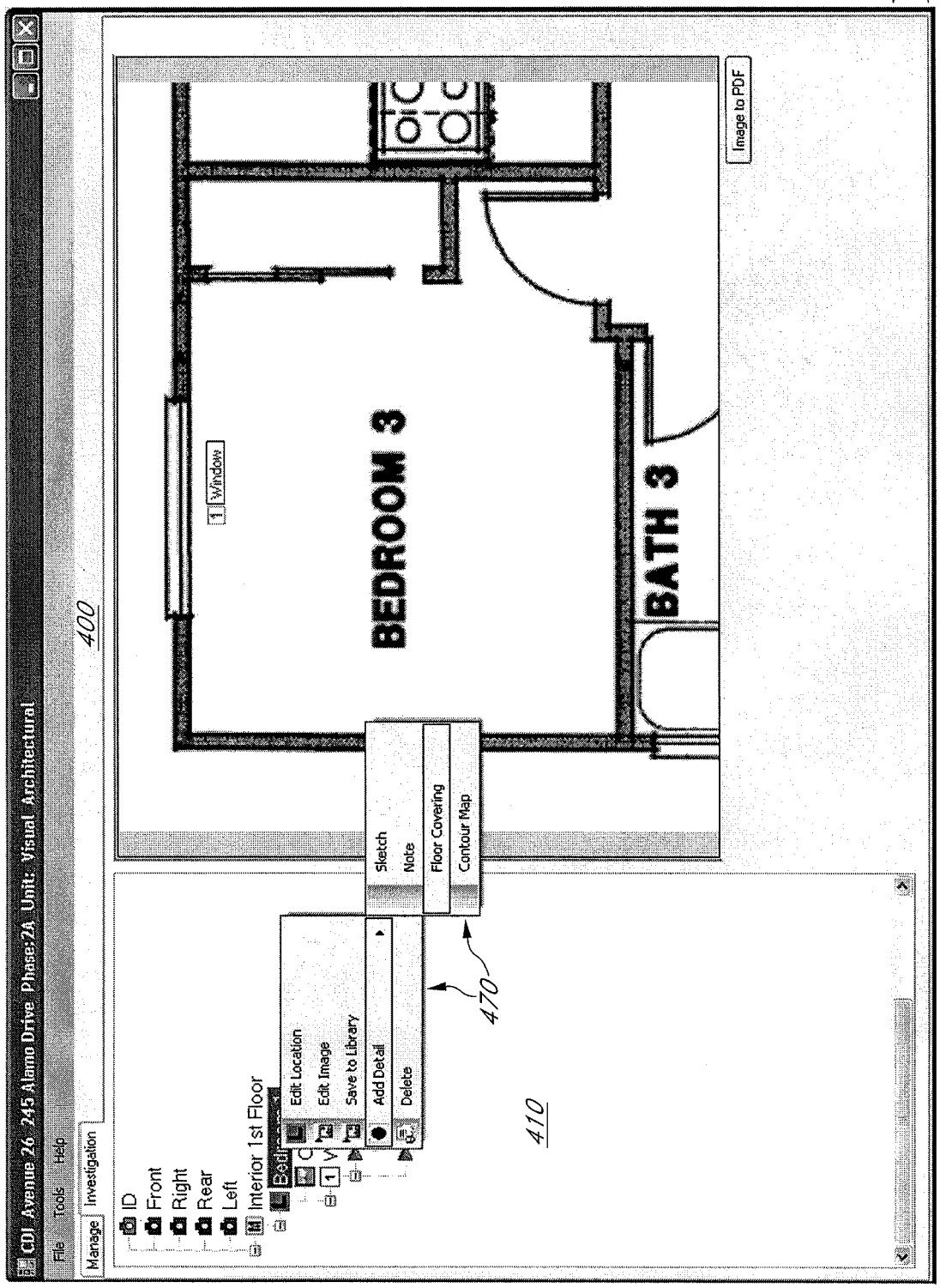
FIG. 20 is a screen shot of the inspection screen showing the addition of a Detail.
Figure 21:
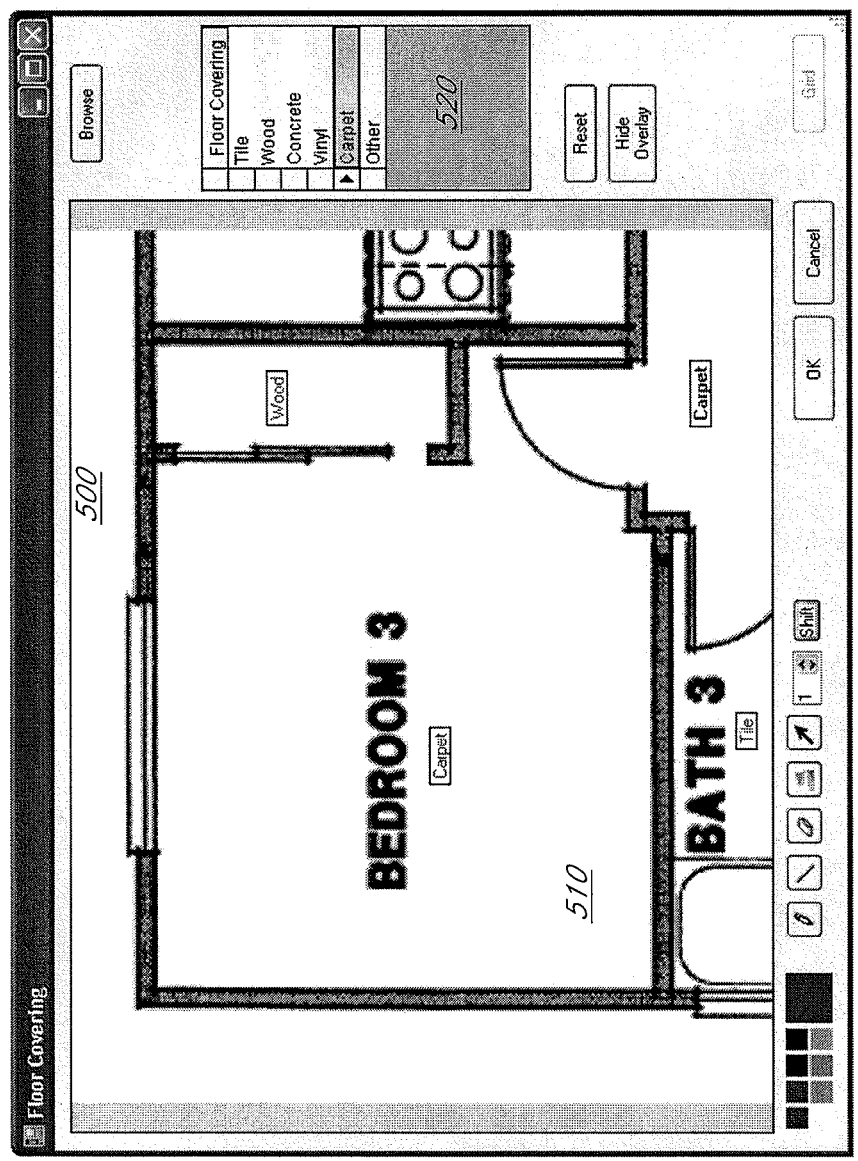
FIG. 21 is a screen shot of a detail screen.
Figure 22:
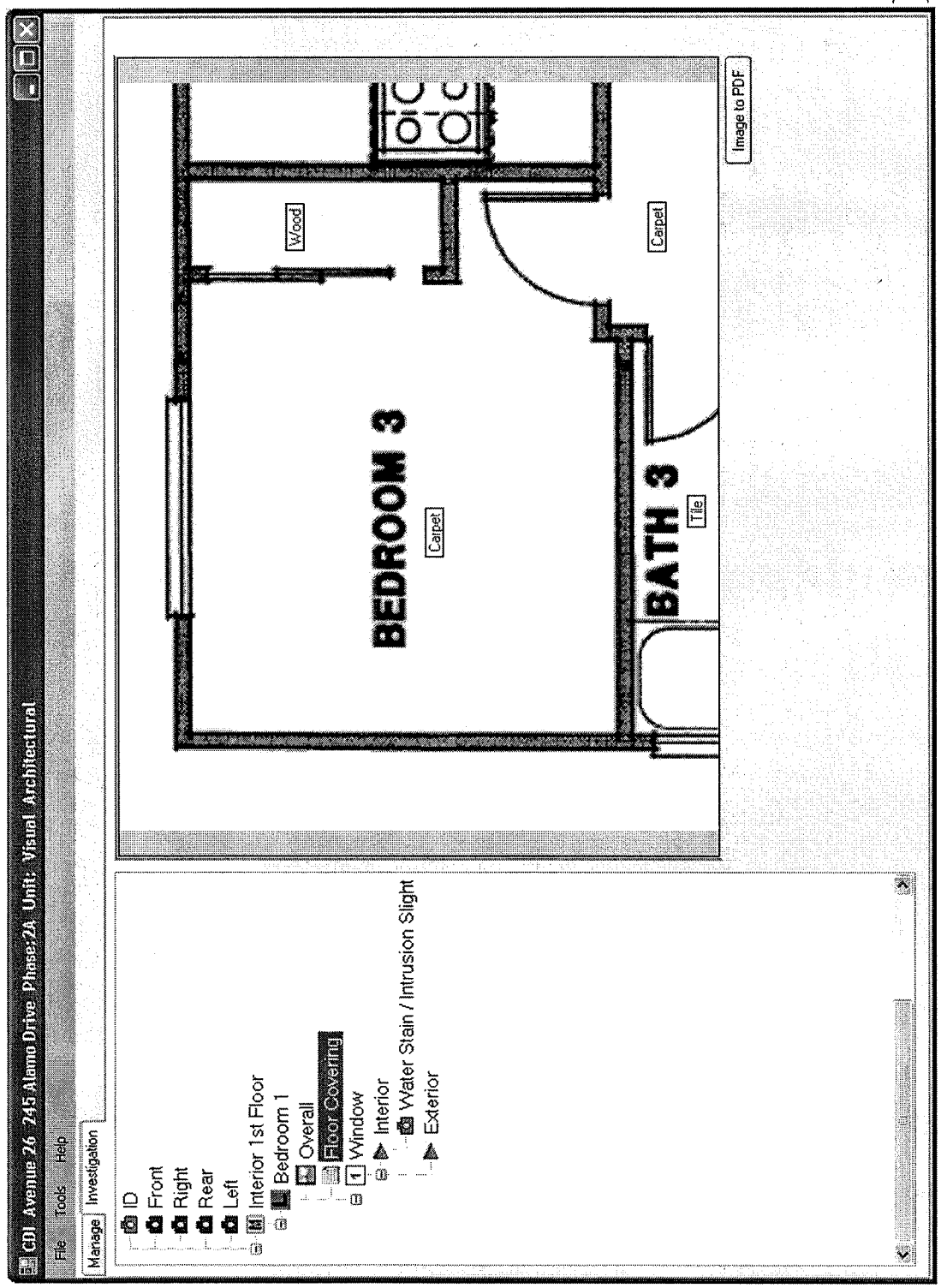
FIG. 22 is a screen shot of the inspection screen of FIG. 12 showing the detail labels which were added with the detail screen of FIG. 21.

FIGS. 20-22 are screen shots showing the addition of a detail to the bedroom 1 sub-location attribute. Details can be added to other items shown in the inspection tree 410.

FIG. 20 is a screen shot of the inspection screen 400 showing the addition of a detail floor covering. As shown in the selection menus 470, other details which may be added are sketch, note, and contour map. In this example, a floor covering detail is added. FIG. 21 is a screen shot of a floor covering screen 500, which has a graphic display 510 and a floor covering list 520. As shown in the graphic display 510, various areas in the graphic representing the floor plan of the bedroom 1 sub-location attribute are labeled with floor coverings from the floor covering list 520. FIG. 22 is a screen shot of the inspection screen 400 showing the floor covering labels which were added with the floor covering screen 500 shown in FIG. 21.

Throughout the preceding description, various elements, such as attributes and observation codes are discussed has having specific relationships with one another. Alternative arrangements are also possible. In some embodiments, additional elements are used and/or certain elements are not used. In addition, certain characteristics are described for each aspect of the examples. These characteristics are not limited to the specific examples and embodiments described. For example, hand drawn annotations may be applied to any graphic and any graphic and multiple graphics may be associated with any element.

The methods and aspects discussed and described above may be implemented using computer systems which have a display, a processor, and an input device with which the users interact. In addition, the methods and aspects discussed may be embodied as instructions on computer readable media, such as a hard disk or a portable non-transient memory. The instructions, when executed, cause the computer to perform various aspects of the methods and processes described above.

The processor may, for example, be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor may be any conventional special purpose processor such as a digital signal processor.

The input device, for example, may be a keyboard, rollerball, pen and stylus, mouse, or voice recognition system. The input device may also be a touch screen associated with an output device. The user may respond to prompts on the display by touching the screen. Textual or graphic information may be entered by the user through the input device.

Instructions refer to computer-implemented steps for processing information in the system. Instructions can be implemented in software, firmware or hardware and include any type of programmed step undertaken by components of the system.

Systems which embody the inventive aspects described above comprise various modules. As can be appreciated by one of ordinary skill in the art, each of the modules comprises various sub-routines, procedures, definitional statements, and macros. Each of the modules are typically separately compiled and linked into a single executable program. Thus, the processes that are undergone by each of the modules may be arbitrarily redistributed to one of the other modules, combined together in a single module, or made available in a shareable dynamic link library. Further each of the modules could be implemented in hardware.

While the above detailed description has shown, described, and pointed out novel features of the invention as applied to various embodiments, it will be understood that various omissions, substitutions, and changes in the form and details of the devices, systems, and processes discussed may be made in different embodiments.

What is claimed is:

1. A method of recording observations of an inspection site, the method comprising:

preparing a data entry form for a specific inspection site configured to be subsequently used by an inspector to record observations for the specific inspection site, in response to an input from a user, accessing predefined inspection data for the specific inspection site, wherein the predefined inspection data defines the prepared data entry form configured to be used by the user to record the observations of the specific inspection site, and wherein the predefined inspection data comprises, at the time of the accessing:

information for a plurality of location attributes specific to the inspection site, information for a plurality of component attributes specific to the inspection site, information for a plurality of observation code attributes specific to the inspection site,
location-component relationship information identifying one or more relationships between each of the location attributes and one or more of the component attributes, and
component-observation code relationship information identifying one or more relationships between each of the component attributes and one or more of the observation code attributes;
presenting to the user one or more selectable location attributes of the inspection data;
receiving a selection of one of the presented location attributes from the user;
presenting to the user one or more selectable component attributes of the inspection data;
receiving a selection of one of the presented component attributes;
presenting to the user one or more selectable observation code attributes of the inspection data;
receiving a selection of a first observation code attribute from the presented observation code attributes from the user; and
storing the selected first observation code attribute, the selected component attribute, the selected location attribute, an observation code-component relationship between the selected observation code attribute and the selected component attribute, and a component-location relationship between the selected component attribute and the selected location attribute;
receiving image data from a camera for an image of the inspection site;
storing the image data;
storing image relationship information identifying a relationship between the image data and at least one of the selected location attribute, the selected component attribute, and the selected observation code attribute;
receiving and storing supplemental image data, wherein the supplemental data comprises notations to the image; and
storing supplemental data-image data relationship information identifying a relationship between the supplemental image data and the image data for the image.

2. The method of claim 1, wherein the selectable component attributes of the inspection data are selectable as a result of the component-location relationship between the selectable component attributes of the inspection data and the selected location attribute.

3. The method of claim 1, wherein the selectable observation code attributes of the inspection data are selectable as a result of the observation code-component relationship between the selectable observation code attributes of the inspection data and the selected component attribute of the inspection data.

4. The method of claim 1, wherein presenting the selectable component attributes of the inspection data comprises:
displaying a graphical representation of the selectable component attributes of the inspection data, and
displaying an indication of the relationship between the selectable component attributes of the inspection data and the selected location attribute.

5. The method of claim 1, wherein presenting the selectable observation code attributes comprises:
displaying a graphical representation of the selectable observation code attributes of the inspection data, and
displaying an indication of the relationship between the selectable observation code attributes and the selected component attribute of the inspection data.

6. The method of claim 1, further comprising receiving a selection of a supplementary observation code attribute from the user, wherein the supplementary observation code attribute is based on an aspect of the inspection site observed subsequent to storing the first observation code attribute of the inspection data.

7. A computer system, comprising:
a display configured to present images to a user; and
a processor,
wherein the processor is configured to:
prepare a data entry form for a specific inspection site configured to be subsequently used by an inspector to record observations for the specific inspection site;
in response to an input from a user, access predefined inspection data for the specific inspection site, wherein the predefined inspection data comprises, at the time of accessing:
information for a plurality of location attributes specific to the inspection site,
information for a plurality of component attributes specific to the inspection site,
information for a plurality of observation code attributes specific to the inspection site,
location-component relationship information identifying one or more relationships between each of the location attributes and one or more of the component attributes,
component-observation code relationship information identifying one or more relationships between each of the component attributes and one or more of the observation code attributes,
cause the display to present to the user one or more selectable location attributes of the inspection data,
receive a selection of one of the presented location attributes from the user,
cause the display to present to the user one or more selectable component attributes of the inspection data,
receive a selection of one of the presented component attributes of the inspection data;
cause the display to present to the user one or more selectable observation code attributes of the inspection data,
receive a selection of a first observation code attribute from the presented observation code attributes of the inspection data from the user, and store the first observation code attribute, the selected component attribute, the selected location attribute, a first relationship between the selected observation code attribute and the selected component attribute, and a second relationship between the selected component attribute and the selected location attribute;
receive image data from a camera for an image of the inspection site;
store the image data;
store image relationship information identifying a relationship between the image data and at least one of the selected location attribute, the selected component attribute, and the selected observation code attribute;
receive and store supplemental image data, wherein the supplemental data comprises notations to the image; and store supplemental data-image data relationship information identifying a relationship between the supplemental image data and the image data for the image.

8. A non-transitory computer readable medium comprising persistent instructions, which, when executed cause the computer to perform a method of recording inspection data at an inspection site, the method comprising:
 preparing a data entry form for a specific inspection site configured to be subsequently used by an inspector to record observations of the inspection data for the specific inspection site;
 in response to an input from a user, accessing predefined inspection data for the specific site, wherein the predefined inspection data comprises, at the time of the accessing:
  information for a plurality of location attributes specific to the inspection site,
  information for a plurality of component attributes specific to the inspection site,
  information for a plurality of observation code attributes specific to the inspection site,
  location-component relationship information identifying one or more relationships between each of the location attributes and one or more of the component attributes, and
  component-observation code relationship information identifying one or more relationships between each of the component attributes and one or more of the observation code attributes;
 presenting to the user one or more selectable location attributes of the inspection data;
 receiving a selection of one of the presented location attributes of the inspection data from the user;
 presenting to the user one or more selectable component attributes of the inspection data;
 receiving a selection of one of the presented component attributes of the inspection data;
 presenting to the user one or more selectable observation code attributes of the inspection data;
 receiving a selection of a first observation code attribute from the presented observation code attributes of the inspection data from the user; and
 storing the first observation code attribute of the inspection data, the selected component attribute of the inspection data, the selected location attribute of the inspection data, a first relationship between the selected observation code attribute of the inspection data and the selected component attribute of the inspection data, and a second relationship between the selected component attribute of the inspection data and the selected location attribute of the inspection data;
 receiving image data from a camera for an image of the inspection site;
 storing the image data;
 storing image relationship information identifying a relationship between the image data and at least one of the selected location attribute, the selected component attribute, and the selected observation code attribute;
 receiving and store supplemental image data, wherein the supplemental data comprises notations to the image; and
 storing supplemental data-image data relationship information identifying a relationship between the supplemental image data and the image data for the image.

9. A computer system, comprising:
 a display configured to present images to a user; and
 a processor for preparing a data entry form of the inspection data for a specific inspection site configured to be subsequently used by an inspector to record observations of the specific inspection site, wherein the processor is configured to:
  cause the display to present to a user a plurality of selectable location attributes of the inspection data specific to the inspection site,
  receive a selection of one or more of the location attributes of the inspection data,
  cause the display to present to the user a plurality of selectable component attributes of the inspection data specific to the inspection site,
  receive a selection of one or more of the component attributes of the inspection data,
  cause the display to present to the user a plurality of selectable observation code attributes of the inspection data specific to the inspection site,
  receive a selection of one or more of the observation code attributes of the inspection data,
  receive image data from a camera for an image of the inspection site
  receive supplemental image data, wherein the supplemental data comprises notations to the image, and
  store inspection data comprising:
   location-component relationship information identifying one or more relationships between each of the selected location attributes of the inspection data and one or more of the selected component attributes of the inspection data,
   component-observation code of the inspection data relationship information identifying one or more relationships between each of the selected component attributes of the inspection data and one or more of the selected observation code attributes of the inspection data,
   image data and image relationship information identifying a relationship between the image data and at least one of the selected location attribute of the inspection data, the selected component attribute, and the selected observation code attribute of the inspection data;
   supplemental image data and supplemental data-image data relationship information identifying a relationship between the supplemental image data and the image data for the image, and
   data for generating an empty data entry form, wherein the data entry form is configured to be subsequently used by an inspector to record observations of an inspection site, and wherein the data entry form has fields based on the selected location attributes of the inspection data, the selected component attributes of the inspection data, the selected observation code attributes of the inspection data, the location-component relationship information, and the component-observation code relationship information.

10. The computer system of claim 9, further comprising:
 a database configured to store the first observation code attribute of the inspection data, the selected component attribute of the inspection data, the selected location attribute of the inspection data, a first relationship between the selected observation code attribute of the inspection data and the selected component attribute of the inspection data, and a second relationship between the selected component attribute of the inspection data and the selected location attribute as inspection data; and
 a computing device in communication with the database, configured to:

access the inspection data, present to an inspector one or more selectable location attributes of the inspection data, receive a selection of one of the presented location attributes from the inspector, present to the inspector one or more selectable component attributes of the inspection data, receive a selection of one of the presented component attributes of the inspection data;

present to the inspector one or more selectable observation code attributes of the inspection data, receive a selection of a first observation code attribute from the presented observation code attributes of the inspection data from the inspector, and store the first observation code attribute of the inspection data, the selected component attribute of the inspection data, the selected location attribute of the inspection data, a first relationship between the selected observation code attribute of the inspection data and the selected component attribute of the inspection data, and a second relationship between the selected component attribute of the inspection data and the selected location attribute of the inspection data.

11. The computer system of claim 10, wherein the database is stored in a memory local to the computing device.

12. The computer system of claim 10, wherein the database is stored in a remote memory and computing device accesses the database via a communication link.

* * * * *